US 8,617,278 B2

Dec. 31, 2013

(12) United States Patent
Sullivan

(10) Patent No.: US 8,617,278 B2
(45) Date of Patent: Dec. 31, 2013

(54) REPLACEMENT CARTRIDGE FILTER WITH PLEATED FILTER MEDIA, AUTOMATIC FILTER MEDIA ADVANCE AND WIRELESS COMMUNICATIONS

(76) Inventor: Challen Sullivan, Delray Beach, FL (US)

( * ) Notice: Subject to any disclaimer, the term of this patent is extended or adjusted under 35 U.S.C. 154(b) by 0 days.

(21) Appl. No.: 13/524,928

(22) Filed: Jun. 15, 2012

(65) Prior Publication Data

US 2012/0317938 A1 Dec. 20, 2012

Related U.S. Application Data

(63) Continuation-in-part of application No. 12/585,514, filed on Sep. 16, 2009, now Pat. No. 8,313,567, and a continuation of application No. 12/953,402, filed on Nov. 23, 2010.

(60) Provisional application No. 61/604,523, filed on Feb. 29, 2012.

(51) Int. Cl.
*B01D 46/00* (2006.01)

(52) U.S. Cl.
USPC .................. 55/354; 55/351; 55/352; 95/277; 96/429

(58) Field of Classification Search
USPC .......... 55/351, 352, 354; 95/273, 277; 96/429
See application file for complete search history.

(56) References Cited

U.S. PATENT DOCUMENTS

| | | | |
|---|---|---|---|
| 1,982,639 | A | 12/1934 | Christofferson |
| 2,016,991 | A | 10/1935 | Dollinger |
| 2,500,123 | A | 3/1950 | Gwaltney et al. |
| 2,808,899 | A | 10/1957 | Hofstetter |
| 3,276,191 | A | 10/1966 | Revell |
| 3,321,345 | A | 5/1967 | Duncan et al. |
| 3,337,898 | A | 8/1967 | Schmid et al. |
| 3,408,795 | A | 11/1968 | Revell et al. |

(Continued)

FOREIGN PATENT DOCUMENTS

| | | |
|---|---|---|
| DE | 19654844 | 7/1998 |
| JP | 6079194 | 3/1994 |

(Continued)

OTHER PUBLICATIONS

"OptimAir Filtration System", product brochure [online]. Optimum Clean Air, LLC, 2012 [retrieved on May 15, 2012]. Retrieved from the Internet: <URL: http://www.optimair.com/ >, 1 page.

*Primary Examiner* — Robert Clemente
(74) *Attorney, Agent, or Firm* — Tangent Law Group, PLLC; Eric J. Weierstall, Esq.

(57) ABSTRACT

A replacement filter deployed within a flow channel with a housing having a first frame member and a second frame member that are detachable with an exposure slot formed within the housing. A filter media storage area is within the housing, having unexposed, folded, pleated filter media stored therein. The unexposed folded, pleated filter media is compactly held within the filter media storage area. A motor is coupled to a power supply and in communication with a controller. The motor moving a movement member that advances an unexposed portion of the stacked pleated filter media into the exposure slot, expanding and exposing the unexposed portion of the media to the flow channel while retaining pleats and creating an exposed portion of the filter media. A containment area is provided where the exposed portion of the pleated filter media is collected folded, restacked and compactly stored and retained.

52 Claims, 21 Drawing Sheets

(56) References Cited

U.S. PATENT DOCUMENTS

| | | |
|---|---|---|
| 3,596,442 A | 8/1971 | Neumann |
| 3,695,008 A | 10/1972 | Neumann |
| 3,774,373 A | 11/1973 | Welch |
| 3,985,528 A | 10/1976 | Revell |
| 4,054,521 A | 10/1977 | Winzen |
| 4,221,576 A | 9/1980 | Phillips, Jr. |
| 4,394,146 A | 7/1983 | Klein |
| 4,405,342 A * | 9/1983 | Bergman .......... 95/69 |
| 4,470,833 A | 9/1984 | Wolfe |
| 5,098,767 A | 3/1992 | Linnersten |
| 5,217,513 A | 6/1993 | Armbruster |
| 5,405,434 A | 4/1995 | Inculet |
| 5,560,835 A | 10/1996 | Williams |
| 5,906,752 A | 5/1999 | Williams |
| 5,912,423 A | 6/1999 | Dought et al. |
| 6,152,998 A | 11/2000 | Taylor |
| 6,168,646 B1 | 1/2001 | Craig et al. |
| 6,402,822 B1 | 6/2002 | Najm |
| 6,454,834 B1 | 9/2002 | Livingstone |
| 6,491,735 B2 | 12/2002 | Najm |
| 6,596,059 B1 | 7/2003 | Greist et al. |
| 6,632,269 B1 | 10/2003 | Najm |
| 6,743,282 B2 | 6/2004 | Najm |
| 6,843,834 B2 | 1/2005 | Schumacher |
| 7,151,264 B2 | 12/2006 | Ehlers, Sr. |
| 7,186,290 B2 | 3/2007 | Sheehan et al. |
| 7,244,294 B2 | 7/2007 | Kates |
| 8,313,567 B2 | 11/2012 | Sullivan |
| 2005/0150382 A1 | 7/2005 | Sheehan et al. |
| 2006/0070527 A1 | 4/2006 | Chapman et al. |
| 2006/0102006 A1 | 5/2006 | Powell |
| 2008/0072763 A1 | 3/2008 | Hauville |

FOREIGN PATENT DOCUMENTS

| | | |
|---|---|---|
| JP | 6233945 | 8/1994 |
| JP | 6246120 | 9/1994 |
| JP | 7275626 | 10/1995 |
| JP | 11104416 | 4/1999 |
| WO | 02/04091 | 1/2002 |

* cited by examiner

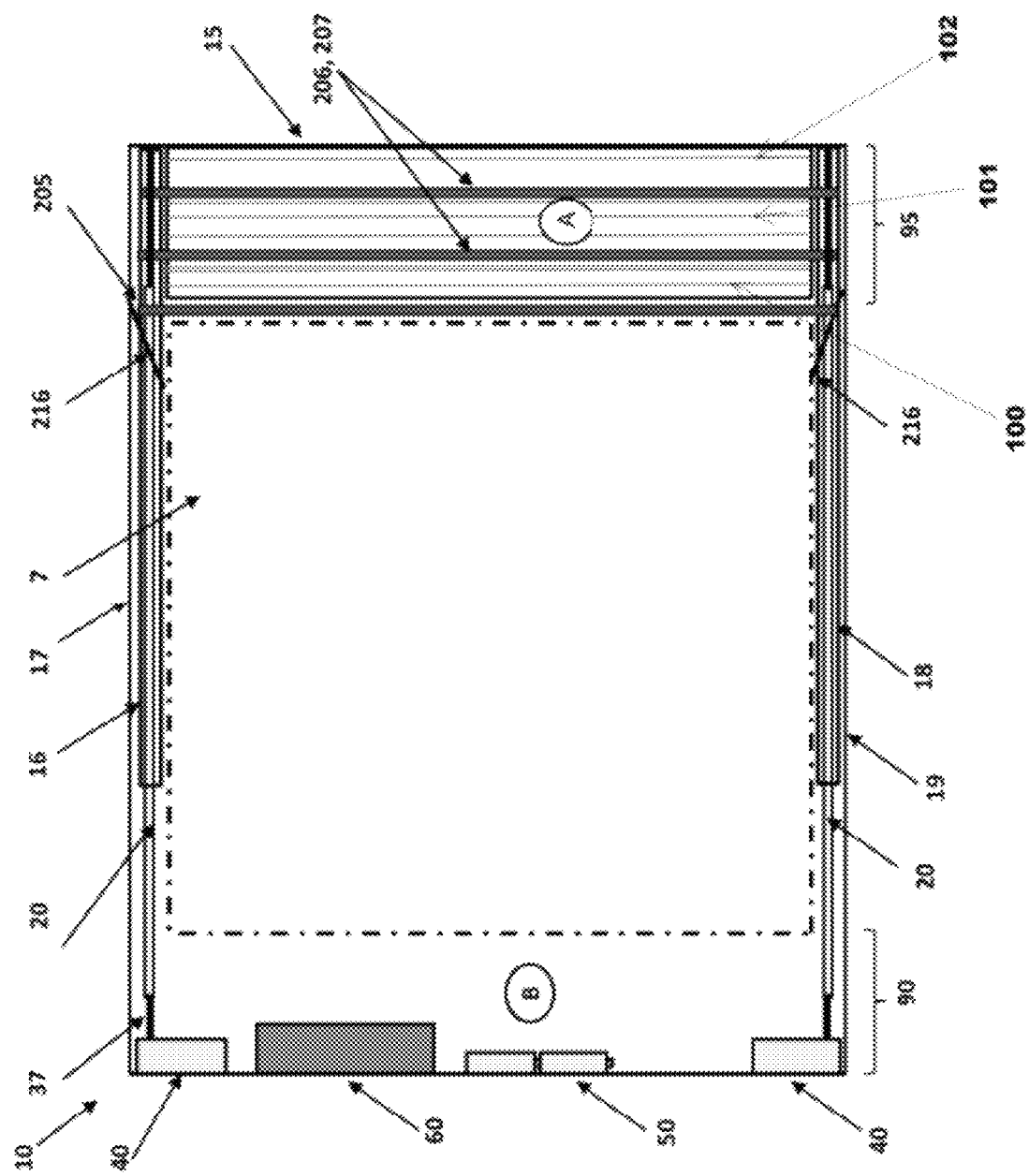

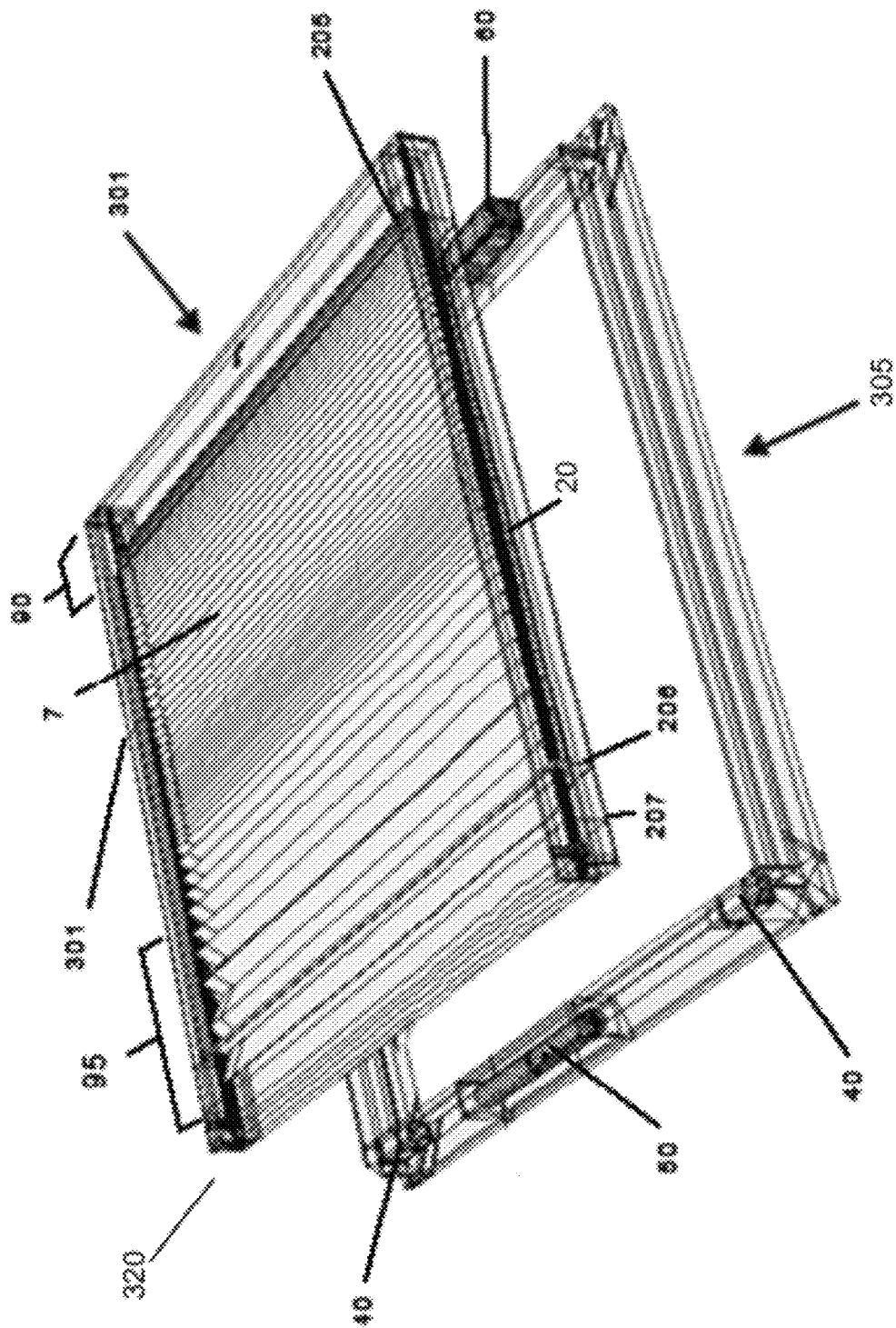

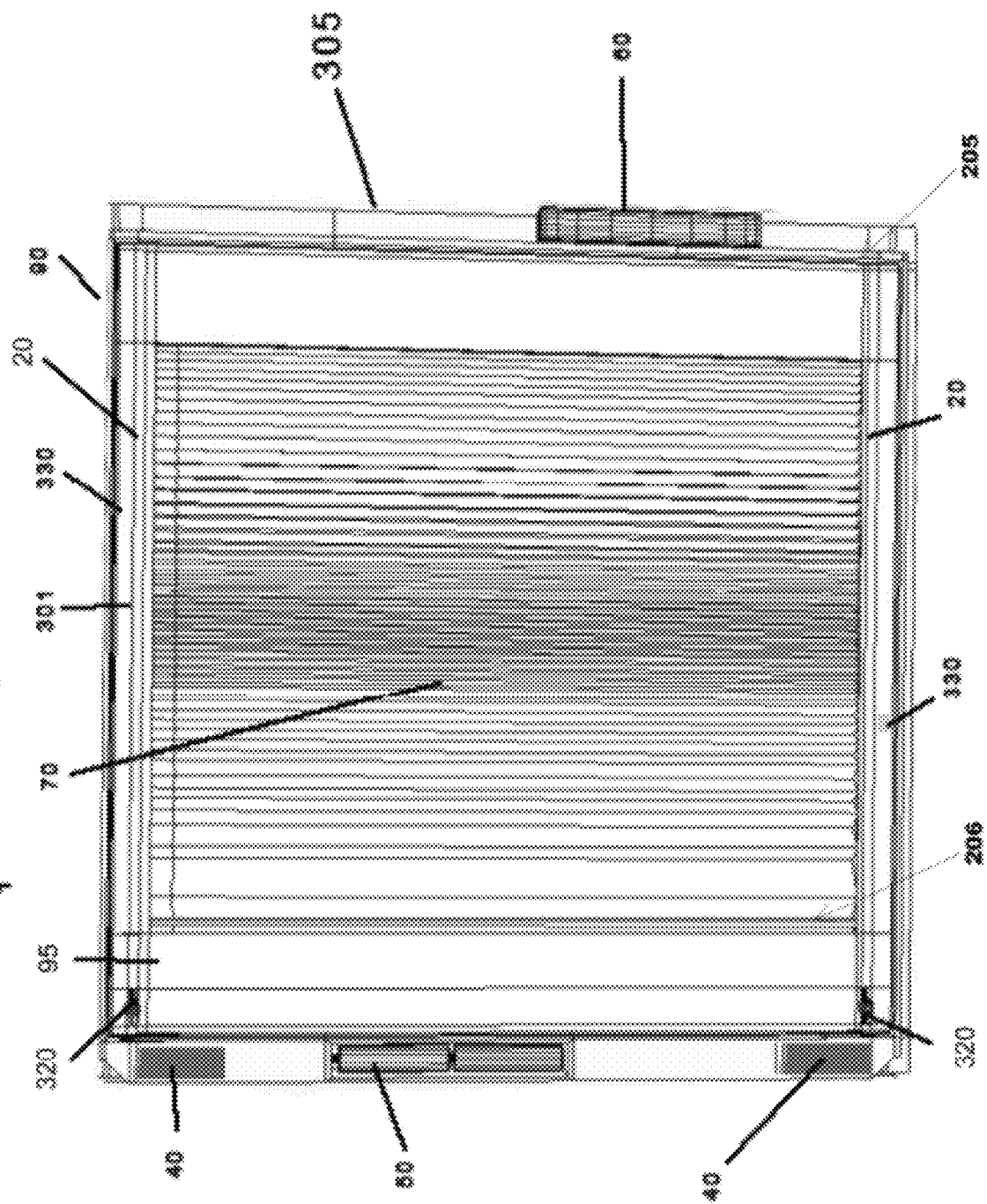

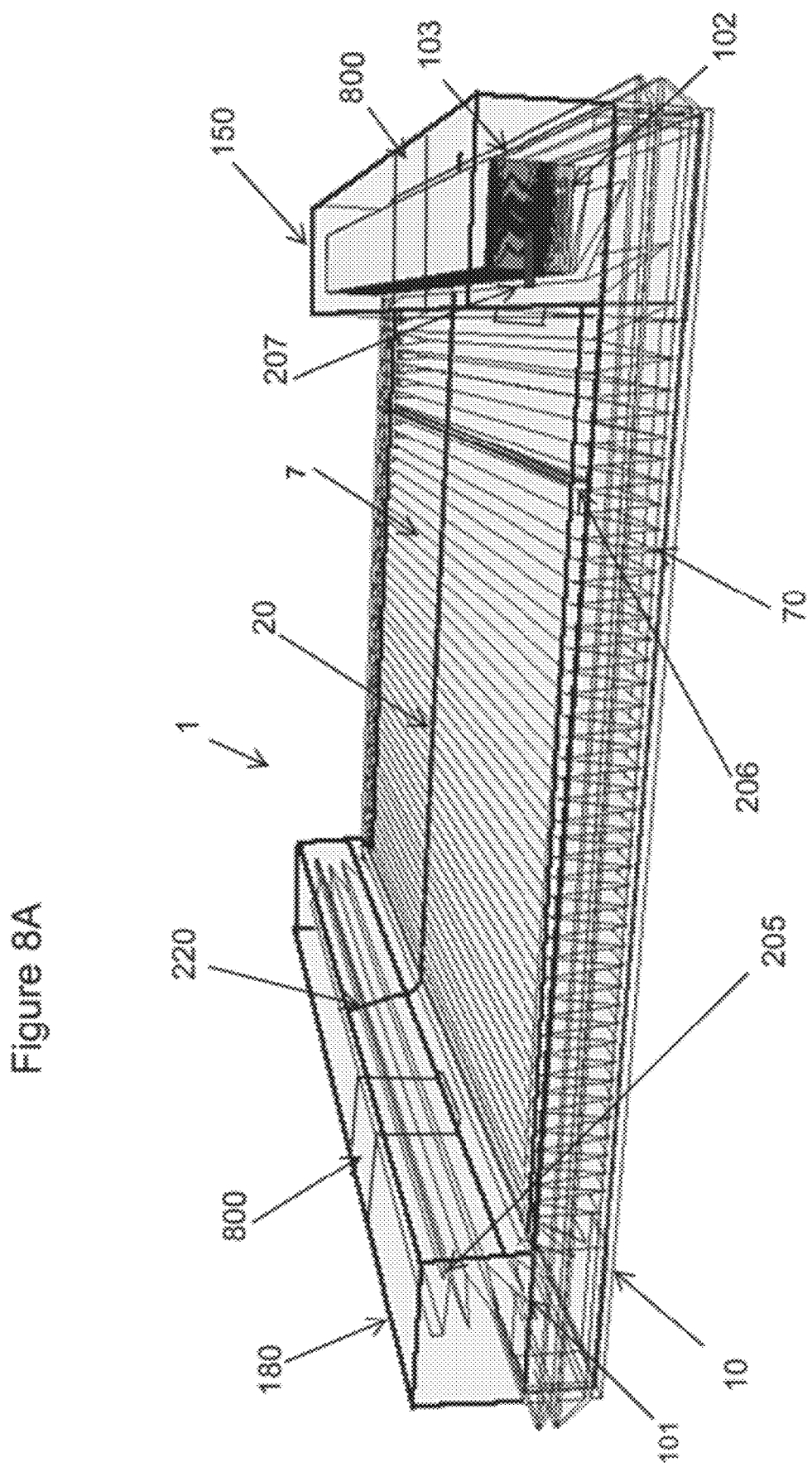

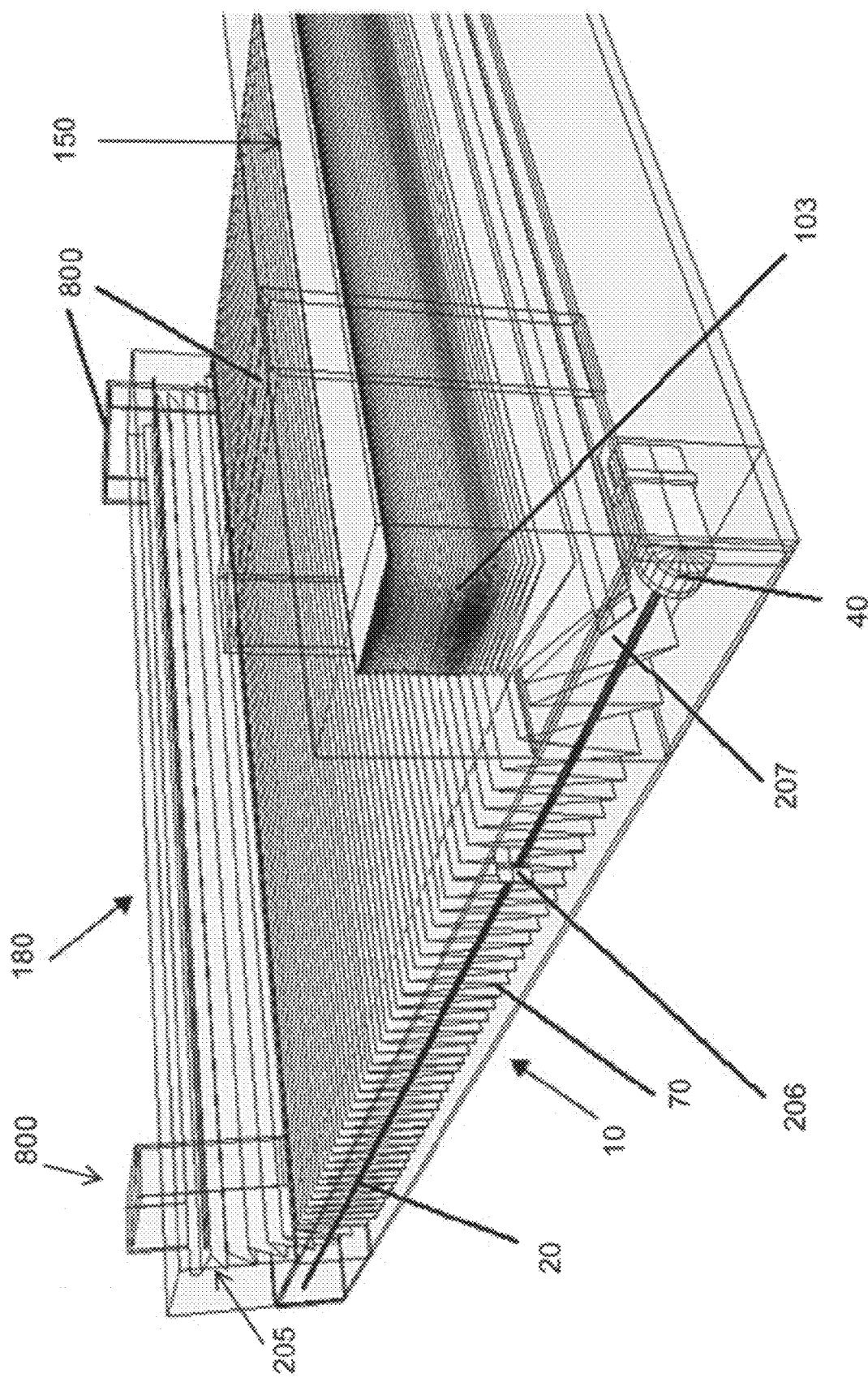

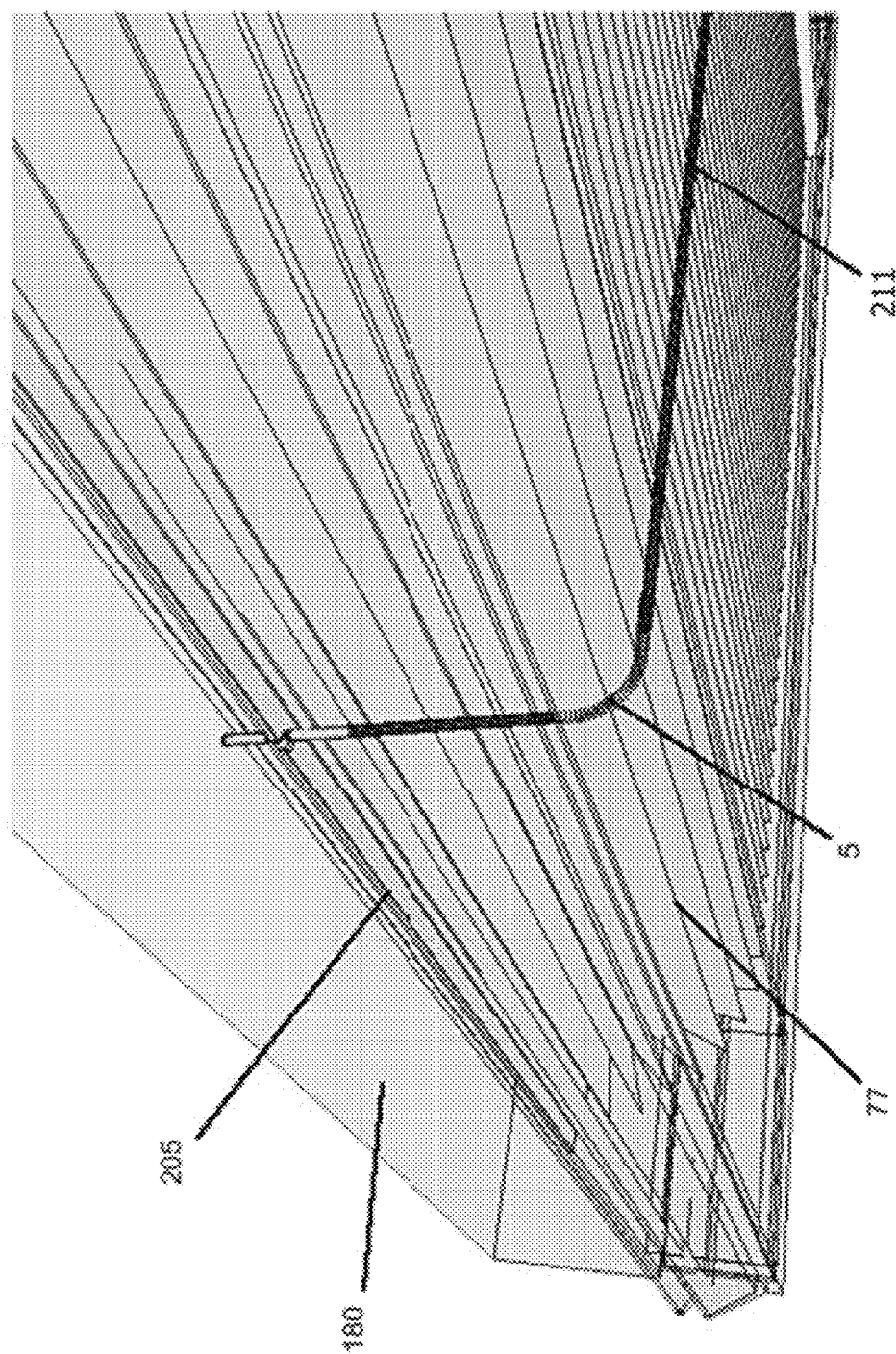

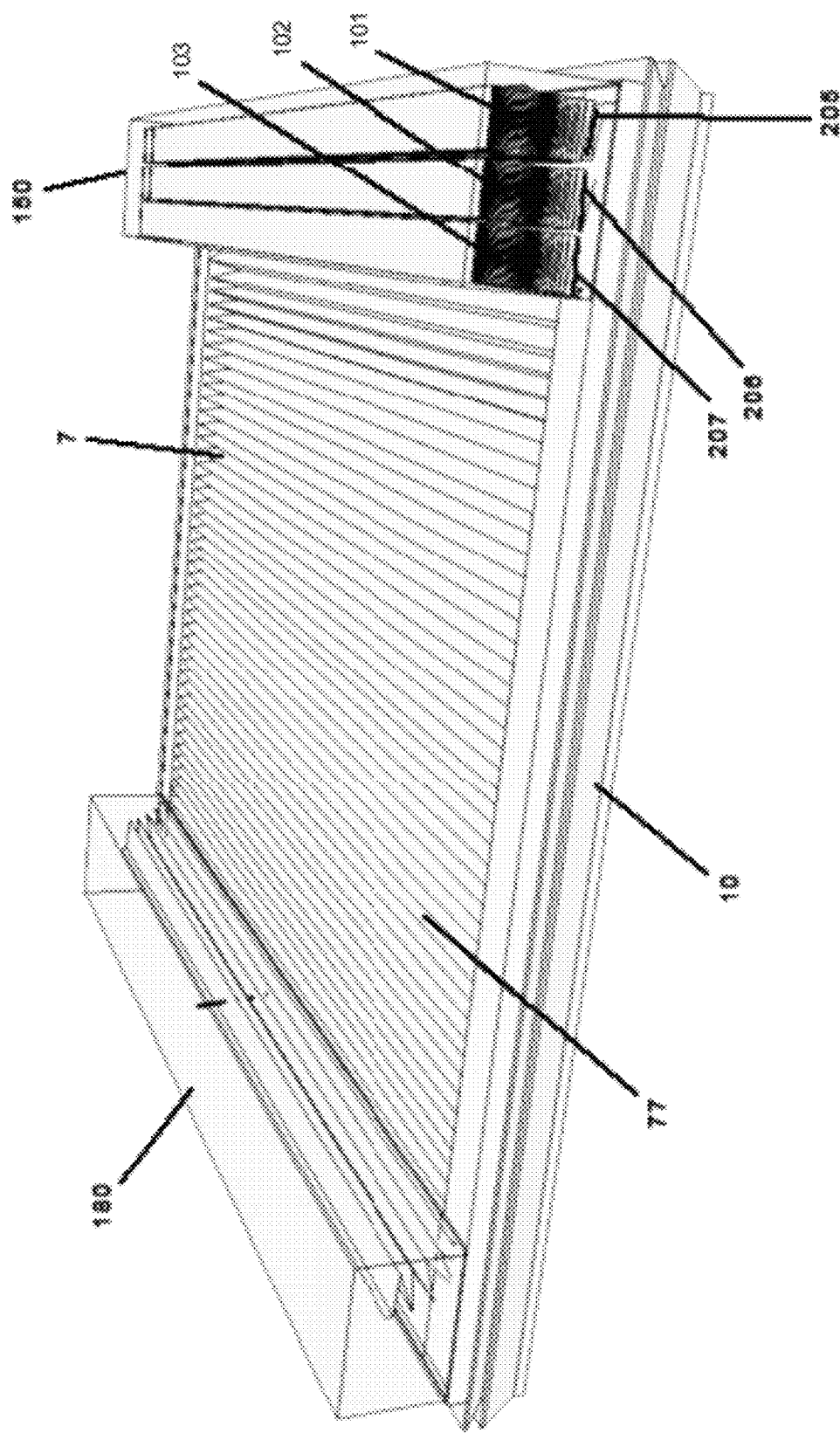

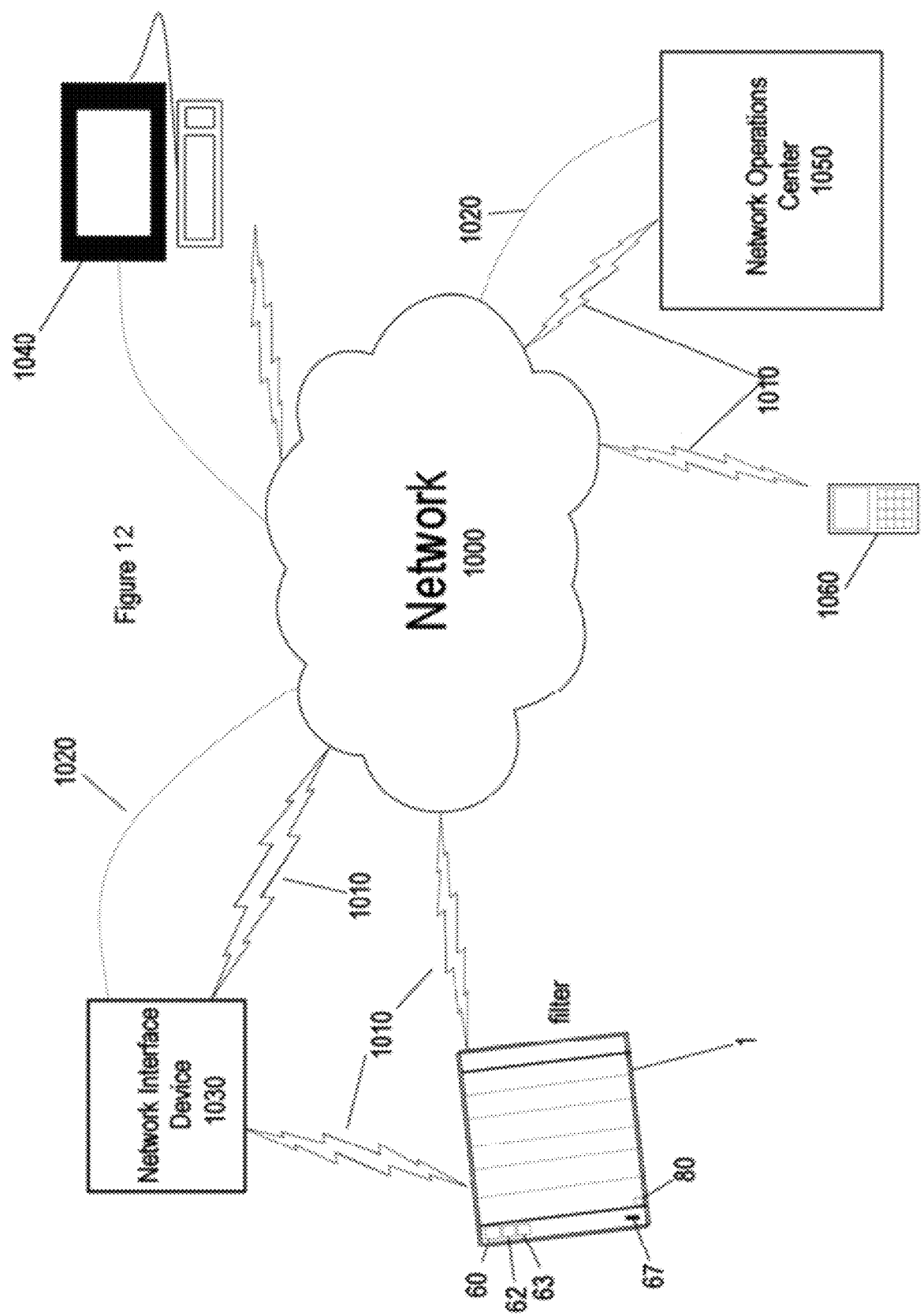

REPLACEMENT CARTRIDGE FILTER WITH PLEATED FILTER MEDIA, AUTOMATIC FILTER MEDIA ADVANCE AND WIRELESS COMMUNICATIONS

CROSS-REFERENCE TO RELATED APPLICATIONS

This application is a continuation-in-part of and claims priority to U.S. patent application Ser. No. 12/585,514, filed Sep. 16, 2009 and Ser. No. 12/953,402 filed Nov. 23, 2010, and claims priority to U.S. provisional application 61/604,523 filed Feb. 29, 2012, which are incorporated herein by reference.

BACKGROUND OF THE INVENTION

1. Field of the Invention

The invention is directed to a gas or liquid agent filter, in an exemplary embodiment having a cartridge replaceable media. The housing having a standard width for such filters so as to be a replacement for existing standard filters and future filters or as a pre-filter. The housing contains a movement member, a motor, a power source, a controller and a filter media cartridge. The exemplary product strives to be both directly replaceable with a filter and disposable with minimum modification to existing equipment and minimum environmental impact. The replacement filter being further located within a flow channel in the filter unit wherein the agents being filtered is passed within the flow channel and passed through the filter media. The replacement filter having a compacted or stored portion of the filter media that is removed as an at least one filter media stack out to replace the initial and subsequent sections of filter media being exposed by the invention to agent within the filter unit. This stack or set of stacks being replaceable in and of themselves as a pre-folded, pre pleated, filter media cartridge system. Additional aspects of the invention include remote monitoring and communication with the filtration unit, enabling monitoring and alert for replacement of the Filter. Additionally, the filtration unit may be enabled to monitor and communicate flow qualities, including for instance contaminants, and to take further actions in response to alerts sent through a network.

2. Background of the Invention

An important component in almost all filtration units in general is a filtration mechanism for removal of particulates and contaminants from the flow of the agent. In Heating Ventilation and Air Conditioning systems (HVAC), for instance, this is preferably before or sometimes after or even both before and after coming into contact with heat exchanging elements. The removal of the contaminants helps prevent reduction in heat transfer associated with accumulation of the contaminants on the heat exchanger elements. Additionally, the removal of these contaminants also improves the quality of the air circulated by the HVAC air handling system. Similarly, in computers, filtration of air used for cooling the electronic elements requires filtration before coming into contact with the electronic elements. Similarly, in pools, the water in the pools requires filtration before being returned to the pool by a circulating system. In some pool systems further filtration is required before chlorination of the pool water. In a host of other industrial and commercial applications, effective media filtration is necessary. The timing for replacing or renewing these filtration mechanisms is therefore important in both improving efficiency and reducing wear and tear in the filtration units in most filtration applications.

In most systems a filter is used through which the media is passed. Dirty filter media result in lower flow rates of the agent in the system which translates to lower efficiency in filtration, especially in HVAC systems where it equates to less heat exchange in the HVAC equipment. The equipment must run longer to accomplish the intended goals, for example contaminant filtration and/or temperature control. In HVAC for instance, air conditioning equipment may freeze up due to such inefficiencies. Additionally, the motors and other components must run longer and harder resulting in increased wear on the entire system, reducing its useful life. Thus, the filtration systems require constant attention and maintenance.

In commercial and industrial applications, it is often the case that the air handling functions are monitored by a control center and maintained based on performance measurements. For example, when utilizing multiple refrigeration units in chemical processing the timing and performance of the cooling units is often integral to the manufacturing process, these systems are therefore monitored and maintained based on sensor reports, typically from within the system itself or based on hours of operation. Upon determination by the controller or by a set schedule, the filters on such systems are replaced.

Similarly, in residential settings, many HVAC companies sell maintenance contracts to residential clients, typically annual or bi-annual in nature, to address routine maintenance. Similarly pool companies regularly inspect and change water filters in chlorination systems and even in home residential water units in the case of hard water softeners for instance. However the removable, replaceable filters that are typically in these units require more frequent replacement by these clients.

Filters for most residential and commercial air filtration and air handling equipment are typically removable, replaceable, rigid, framed units. Rigid framed filters can be time consuming to replace or clean and often require frequent replacement, typically monthly in the case of residential applications. This also requires an added amount of attention by an industrial or commercial maintenance staff or residential unit owner. For instance, in a commercial setting the restaurant owner or similar commercial customer must provide an even greater amount of attention to cleaning and/or replacing these types of filters. The filters often go unchanged as users forget to change the filter regularly. This shortfall has been well known and several attempts have been made in the past to provide long lasting filters. Several attempts have been made to provide a reel system, see for example US Patent Application No. 2006/0102006, Japanese Patent No. JP06233945, German Patent No. DE19654844 A1, U.S. Pat. Nos. 6,168,646, 4,470,833, 6,152,998, 4,221,576.

Though these have extended lengths of service, in each instance, the resulting device requires modification of the HVAC unit or uses less efficient media shapes and sizes. This makes these existing devices impractical for easy use, installation and maintenance by a typical end user. For example, as seen in U.S. Pat. Nos. 6,152,998, 6,632,269, 6,491,735, 6,402,822, and 6,743,282 and the commercially available OPTIMAIR system, often the reels are located outside the unit and are located in a reel storage area that does not easily fit within the confines of the existing filter system and is not easily scalable. This also prevents replacement of the existing filter with these types of units as the footprints are completely different and these systems are not replacements for the existing filter or an effective filter or pre-filter with pleated, replaceable media.

Other commercial applications use sheets that are stretched between rolls on either side of an air duct, see for example U.S. Pat. No. 6,632,269 to Najm, 4,331,576 to Phillips Jr., or U.S. Pat. No. 6,152,998 to Taylor. In each embodiment, significant modifications to the HVAC or cooling system would need to be made to install the devices or they use a non-standard footprint. The systems do not provide retrofitting the filter structure to existing HVAC equipment and moreover, they require significant installation steps as outlined above with respect to residential units that operate in a similar manner.

Additional attempts have been made to address the issue in a commercial HVAC application, for instance U.S. Pat. No. 7,186,290 to Sheehan. In U.S. Pat. No. 7,186,290, a stack of filters is cycled through the device. This system requires a large amount of modification to incorporate into existing devices, as with other existing designs. Additionally, the stacks of stored filters require a significant amount of space in or around the HVAC unit. Thus, to fit existing systems requires either significant additional modifications or additional space to operate and provide extended use filter systems. Moreover, no economical method of providing a self-renewing or extended use filter within the standard footprint of the existing filter housings has been provided.

An exemplary replacement filter would be one that fits into existing filter footprints as defined by the OEM. A uniform and industry standard width is provided in almost all residential and most commercial filters. Similarly, industrial applications, though often purpose built, have specific filter footprints after completion and replacement of these custom sizes is also contemplated. The filters shown in all of the above noted patents and publications require extensive modifications to fit in the place of the existing filters in these air handler and HVAC systems and lack the specified media stack. In addition, those systems do not provide for a media cartridge that provides for efficient removal and optionally sealing the exposed media stack. The provision of a compacted, pleated, folded media stack as a cartridge provides for the most efficient shape for most applications. In addition the existing media solutions cannot be used to provide side sealing in conjunction with the filter nor do the cartridges fully isolate and seal once spent. Further the installation of the systems would require additional wiring and would likely require professional installation. Additionally, little or no communications are provided at the source of filtration, therefore, these systems cannot effectively communicate the status of the air being handled or further communicate with machinery or other devices.

To date, no commercially successful system has been produced for use in conventional filtration systems without modification or extending beyond the footprint provided for the replaceable filter. An exemplary replacement filter having a footprint that fits in the standard width in an existing system that also has an extended use, while being more environmentally friendly and remaining sealed preventing re-exposure or re-admission of contaminants to the air and the system is needed. Moreover, no economical exemplary method of providing a self-renewing or extended use filter within the standard footprint of the existing filter housings and providing a compacted, pleated, folded filter media that can be expanded and then compacted again has been provided. Additionally, no filter to date with such extended use and standard footprints exists that can both store and communicate air quality through a sensor to a communications network and, based on that communication, prompt an alert to a user or control center.

There is, therefore, a need for a method and apparatus for providing for a self-renewing or extended use filter for filtration applications that has a standard footprint that fits within existing commercial and residential apparatus, provides extended useful life to the filter, requires little or not modification to install in existing equipment, facilitates and enhances communication of the air quality, communicates with other elements of the filter or a network, provides for replaceable media through a filter media stack cartridge, and has a minimal impact on the environment when discarded. Further, though the exemplary embodiments are shown for replacement air handler filters, in addition to air handlers and HVAC systems, the instant invention is adaptable to other filtration applications, some non-limiting examples being spray booths, computers, room and building air purification, gaming machines, clean rooms, electronics manufacturing, water filtration, pool and spa filtration, chemical and other liquid and gas filtration, and other applications utilizing filtration.

SUMMARY OF THE INVENTION

An aspect of the invention is to provide an extended life replacement cartridge filter having pleated filter media that is moved and returned in a compact folded, pleated filter media stack that is fully disposable.

A further aspect of the invention is provide an even further extended life replacement cartridge filter having a magazine cartridge storage area having several changes of material stored therein.

Yet another aspect of the invention is to provide a sealed replacement filter to minimize re-admission and exposure to the collected contaminants during operation and replacement, the spent filter being contained within the sealed housing unlike many roller systems which require removal or handling of the spent filter material, the instant invention minimizes this contact and the potential for readmission to the flow.

An aspect of the invention is to provide a compact, pleated, folded filter media stack provided in a cartridge and extended into the replacement filter from the compact, pleated, folded state to an extended state and then back to a compact, pleated, folded exposed filter media stack.

A further aspect of the invention is to seal the filter cartridge such that the filter media is extended from its compact stored state to a deployed state and back to its compact, folded, pleated state after exposure and sealed in the cartridge.

Yet another aspect of the invention is to provide a filter cartridge with a compact, pleated, folded filter media stack that moves to an expanded state and provides side sealing in the filter media.

A still further object of the instant invention is to provide a replacement filter having a pleated, folded filter media stack with a controller, the pleated filter media stack and the controller being in a housing and the pleated media filter being unfolded at its pleats in the flow channel. The controller moving the media within the housing over an extended period of time from a cartridge with the filter media stack, while the housing fits a standard width or footprint for an existing filter.

A still further aspect of the invention is to provide the filter media stack in an at least one replaceable cartridge, the at least one replaceable cartridge deploying the filter media stack so as to unfold the filter media stack, expose the unfolded filter media, and then restack the filter media so as to compact the filter media for removal and insertion of a new cartridge.

Yet another object of the invention is to provide measurement and reporting of the status or quality of the air being handled, with enhanced communications directly from the filter through sensors on the unit and provide communications with other devices or a network or both.

The invention includes an article of manufacture, an apparatus, a method for making the article, and a method for using the article The article of manufacture and apparatus of the invention includes a replacement filter within a flow channel having a first frame portion of an at least two frame portions. An at least one movement device is included with an at least one motor coupled to and driving the at least one movement device. An at least one power source powers the at least one motor. A controller is coupled to the motor. A least one filter media stack is provided having a filter media, the filter media being pleated and folded and compactly stored in the stack. A second frame portion of an at least two frame portions is also provided that couples with the first frame portion of the at least two frame portions forming a housing with an at least one exposure slot through which the fluid channel passes. The first and second frame portions of the at least two frame portions coupling such that the at least one movement member engages the at least one filter media cartridge stack in one of the at least two frame portions and the at least one member moves the filter media upon instruction from the controller from a pleated, folded and compact state to extend across the at least one exposure slot to expose the pleated and extended filter media to the flow and through the movement of the at least one movement member to remove exposed filter media and restack and store the exposed filter media in a media cartridge stack.

The movement member can further comprise an at least one of a cord, wire, string, track, puller or pinch rollers, star, toothed, or pin roller, screw drive, threaded rod, or a take-up roller. The movement member can also comprise an at least one threaded rod threaded rod and may further include an at least one sweep bar, where the threaded rod engages the sweep bar and moves the filter material and each of the at least one sweep bars, where each of the at least one sweep bars is spaced such that the bar separates a length of filter media that fills the space across the exposure slot.

The pleated and folded and compactly stored filter media can further include an adhesive element where the adhesive bond strength of the at least one adhesive element permits removal of the pleats from the folded, pleated filter media stack by a selective removal device such that an at least one portion of the pleats at the point of contact with the adhesive element may remain adhered.

The at least one movement device and the at least one motor can be contained within the first frame portion. The at least one filter media stack can be contained in the second frame portion. The filter media stack can be at one end of the housing in a storage area. The exposed filter media is stored in a containment area. The containment area can be sealed. The containment area can be at a further end of the housing.

The filter media can be drawn from the filter media stack into a storage area and stored in a compact, pleated, and folded fashion. The containment area can within the filter media stack, such that the filter material is drawn back into the filter media cartridge after exposure. The first and second of the at least two frame portions can be of uniform thickness. The first of the at least two frame portions can have channel portions. The second of the at least two frame portions can have leg portions that sliding engage the channel portions to couple the first frame portion and second frame portion of the at least two frame portions.

The filter media stack can include an at least one portion of filter media of sufficient length to provide sufficient unexposed filter to cross the exposure slot and become exposed filter media. The sensor can report a condition of the exposed portion of the filter media to the controller and the controller upon receipt of the condition determines if movement of the movement member moves an amount of unexposed media into the exposure slot to cover the exposure slot. The filter can include several spacers or sweep bars to divide several lengths of unexposed media which are stored and moved into the exposure slot based on commands from the controller.

The first frame portion of the at least two frame portions can be a cartridge with the filter media stack therein and the second frame portion of the at least two frame portions is a frame, wherein the filter cartridge is placed within the frame and engaged by the movement member. The frame can be constructed of stiffened cardboard or plastic or metal. The frame can contain the at least one motor with the at least one power source and the controller. The at least one cartridge can contain the at least one movement member. The at least one motor can be coupled to the at least one movement member through a coupling that penetrates through the exterior of the filter cartridge. An at least one securement coupling can be provided wherein with the insertion of the filter cartridge into the frame the at least one securement coupling secures the filter cartridge and engages the coupling.

The first frame portion of the at least two frame portions can further comprise a supply cartridge and the second frame portion of an at least two frame portions can further comprise a collection cartridge and a third frame portion of an at least two frame portions couples to the first and second portions to form the housing with the first and second portions of the at least two portions extending from the housing. An at least one securement can be provided coupling the supply cartridge and the collection cartridge to the housing. The at least one securement coupling cane be an at least one of an at least one releasable straps, snaps, buckles, interlocking parts slidingly engaged, clasps, and friction fit elements.

The filter media stack can extend in the supply cartridge in the same plane as the housing with a movement bar dividing the pleated, folded and stacked filter media stack. The media stack is advanced and a further media stack having a sweep bar can be pulled down from the supply cartridge. An at least one guide member can be provided to assist in advancing the exposed folded, pleated media into the collection cartridge. The media stack can be withdrawn into the collection cartridge and the sweep bar is driven along a single threaded shaft as a movement member in the middle of the housing and then upward onto a further guide member into the collection cartridge. The collection cartridge can be U-shaped, straight horizontal, vertically stacked, or s-shaped. The collection cartridge can be an angled collection cartridge. An at least one guide rail can be included in the collection cartridge. The guide rail can be a turning screw mechanism and assist in driving an at least one sweep bar. The movement member can be an auger screw on the collection cartridge side of the exposure slot and a star wheel indexer on the supply cartridge side of the exposure slot.

An at least one processing module and an at least one transceiver module can be provided on the controller and an at least one sensor can be included, the controller communicating with the at least one sensor, the at least one sensor communicating data to the processing module and the controller, and the transceiver module transmitting data from the filter to a network or a storage device. The at least one sensor can be coupled to the controller and sensing an at least on operating parameter for the filter. The at least one sensor can measure temperature, mold count, carbon monoxide, carbon dioxide, Volatile Organic Compounds (VOCs), smoke, fire, noxious gases, and air particle concentrations or the at least one sensor measures air flow and reports estimated energy consumption to the network or storage device. The controller can communicate through the transceiver module with a further network interface device. The network interface device can be a Wi-Fi enabled device or an internet gateway to a network which in turn reports it to an alert device or a Network Operations Center or control center.

The apparatus of the invention also includes a replacement filter deployed within a flow channel having a housing with a first frame member of an at least two frame members and a second frame member of an at least two frame members that are detachable with an at least one exposure slot formed within the housing by the at least two frame members. An at least one filter media storage area is within the housing, having unexposed, folded, pleated filter media stored therein, the unexposed folded, pleated filter media being pleated, folded, and stacked to be compactly held within the at least one filter media storage area. An at least one motor is coupled to a power supply and in communication with a controller, the at least one motor moving an at least one movement member that advances an unexposed portion of the compactly held pleated, folded, and stacked pleated filter media into the at least one exposure slot, expanding and exposing the unexposed portion of the pleated filter media to the flow channel while retaining the pleats and creating an exposed portion of the at least one pleated filter media. And a containment area, wherein the exposed portion of the pleated filter media is collected folded, restacked and compactly stored and retained within the containment area.

The containment area can be a filter media cartridge, the filter media cartridge containing a folded pleated filter media stacked and stored so as to be in a compact state and, after being engaged by the at least one movement member, selectively removed from the compact state. The stacked filter media can be held with an at least one adhesive element having a separation force such that the separation force allows for separation of the folded, pleated filter media such that an element of the pleat remains adhered so as to prevent air flow around an edge of the unexposed portion of the filter media when it is in the exposure slot.

An at least one processing module and an at least one transceiver module can be included on the controller and an at least one sensor, the controller communicating with the at least one sensor, the at least one sensor communicating data to the processing module and the controller, and the transceiver module transmitting data from the filter to a network or a storage device. The at least one movement member comprises a star wheel moving the material from a portion containing the unexposed filter media with pleats contained thereon and an at least one auger screw drive assisting in collecting the exposed, pleated filter media and further comprising an at least one support assisting in supporting the filter media on the pleats and assisting in producing a pleated pattern.

The first frame member can be a housing frame and the second frame member can be a filter. An at least one motor coupling can be provided, the at least one motor coupling engaging the at least one motor to the at least one movement member wherein the first frame member can contain the at least one motor, the at least one controller, and the at least one power source and the second frame member can contain the filter media stack and the at least one movement member. The first frame member can contain the at least one motor and the at least one controller and the second frame member can contain the filter media stack, the at least one movement member, and the at least one power source.

The at least one movement member can be an at least one of at least one cord, wire, string; track, puller or pinch rollers, star, toothed, or pin roller, screw drive, threaded rod, or a take-up roller. The at least one movement member can be an at least one screw drive or threaded rod.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIGS. 3A-3C show the operation of the embodiment of FIG. 1.

FIG. 5 shows a top/isometric further exemplary embodiment of the instant invention having a cartridge with a filter media stack therein.

FIG. 6 shows an assembled filter of the exemplary embodiment of FIG. 5.

FIGS. 8A, 8B and 8C show isometric of a still further exemplary embodiment of the instant invention having a cartridge with a first media stack in line with the housing and an additional vertical filter media stack.

FIG. 9 shows an isometric of a still further exemplary embodiment of the instant invention having a cartridge with a first media stack inline and a magazine cartridge with multiple vertical filter media stacks therein.

FIG. 12 shows a plan view of an exemplary embodiment of the invention communicating with other devices or a network or both.

DETAILED DESCRIPTION OF THE INVENTION

Figure 1:
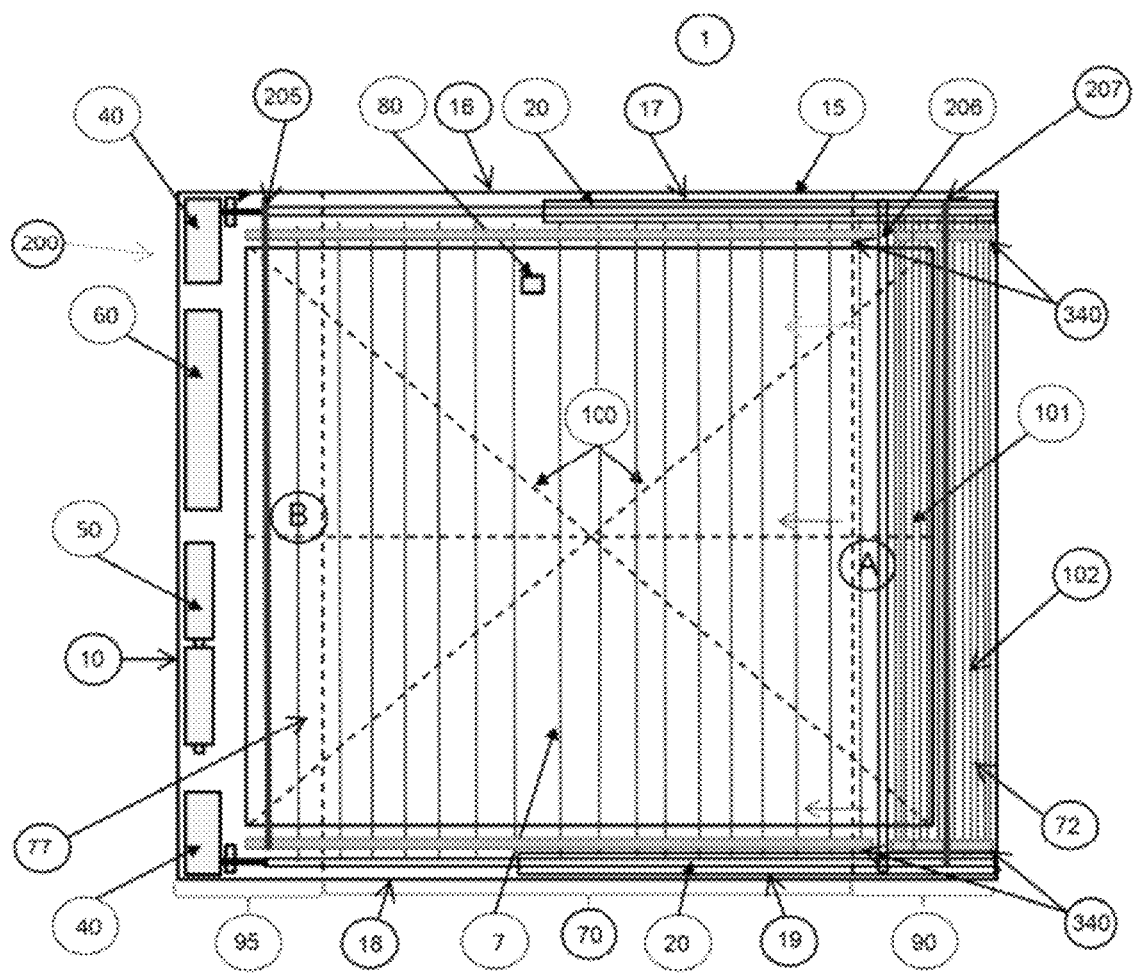
FIG. 1 shows a top/isometric view of an exemplary embodiment of the instant invention having a cartridge with a filter media stack therein.

In describing the invention, the following definitions are applicable throughout.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a lap top; a net book; a smart phone; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; a thumb drive; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; applications; and programmed logic.

A "computer system" refers to a system having a computer, where the computer comprises a computer-readable medium embodying software to operate the computer.

A "network" refers to a number of computers, computer systems and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); a cellular network; a Wi-Fi enabled network of computers; a network of security systems; and a combination of networks, such as an internet and an intranet or a WAN enabled Wi-Fi network through a wireless provider or any similar network element or network.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

The instant invention is directed to a replacement filter having an at least one cartridge replacement with a pleated, folded media stack. In the exemplary embodiments, the housing fits standard width for filters so as to be a replacement filter for existing filtration systems. The replacement filter contains, at least in part, an at least one motivator or movement element, a motor, and a power source, all of these elements being green friendly, a controller and a folded, pleated filter media stack. The product is therefore both replaceable and disposable with minimum environmental impact. The replacement filter being further located within a channel in the filtration unit wherein the fluid or gas agent is passed within the channel and passed through the pleated filter media.

The exemplary embodiments of the invention shown utilize a compacted "clean" portion of the filter media that is in a deployable folded, pleated media stack that is deployed, exposed, and collected within the device. In most of the exemplary embodiments shown, the filter media is folded or pleated and stored in a storage section. A movement element in the embodiments is attached to the media when the folded, pleated media stack is inserted into the filter device frame. The folded, pleated media stack is engaged with the movement element. In response to the controller the motor moves the movement element. The movement element in turn moves the media into the fluid or gas flow channel. When the controller determines a change of filter media is necessary, the movement element again moves and the exposed media is moved from the flow channel into a collection section where it folds and is stored and draws an unexposed portion into the exposure area. This movement of the filter media is produced by the movement element. This movement and storage of the media results in an extended length of operation for the replacement filter that does not require special installation, minimizes environmental impact after disposal, and is self-contained, thus minimizing readmission of containments while allowing for replacement of the cartridge media. The filter media is a pleated, folded filter media, the pleats providing added surface area in the exposure area. The filter media is stored in pre-pleated stacks and is collected and stored in a containment area preventing re-admission and re-exposure of the contaminants collected in the exposed media. As noted below, safeguards in the system can be used to further prevent readmission or reexposure during replacement of the cartridge or filter media stack as described below.

FIG. 1 shows an isometric view of an exemplary embodiment of the instant invention shown in shadow and having a cartridge with a filter media stack therein. A replacement filter 1 is shown. The replacement filter is located such that it is in a path or channel of the flow of the agent or material being filtered (not shown). The filter 1 has a first frame portion 10 of an at least one frame portion. The first frame portion 10 having channel portions 16, 18. The channel portions 16, 18 can be any shape but in the exemplary embodiment the channel portions 16, 18 are C channel portions which interlock with leg portions as described herein below to form a completed housing 200.

In the exemplary embodiment shown the first of the at least one frame portions 10 contains at least one motivator or movement device or movement member or element 20, in this instance a pair of threaded rod shafts or screw drives, the at least one movement member 20 being driven by an at least one motor 40 with a power source 50, and a controller 60. Other movement members may be utilized in further exemplary embodiments. Some non-limiting examples of movement members include but are certainly not limited to at least one cord, wire, string; track, puller or pinch rollers, star, toothed, or pin roller, screw drive, threaded rod, a take-up roller, or similar movement device or member. Although reference is made to these elements being in a first of an at least one frame portion 10, some or all of the elements may be located in other frame portions as shown in the further embodiments described herein or as would be otherwise understood by one of ordinary skill in the art.

A second frame portion 15 is provided in the exemplary embodiment shown. The second frame portion has two leg elements 17, 19 which fit within the channel elements 16, 18 of the first frame portion 10. Stored with the second frame portion 15 is an at least one pleated filter media stack 100, 101, 102. The at least one pleated filter media stack 100, 101, 102 is formed by stacking a filter media in a pleated fashion such that it is easily compressed and then deployed. For example, by the process shown in Applicant's co-pending applications for "A Method of Adhering A Pleated Filtration Media And Filter And Media Filter Stack" filed as U.S. Patent Application 61/604,523 which is incorporated by reference or other methods of creating the filter media stack and may include adhesive portions or elements 340. In the exemplary embodiment, a cut length of pre-pleated filter media sheet is compressed and separated into lengths that effect a full change of the material in the exposure slot 7 of the instant invention. The resulting pleats in the folded, pleated filter media stack 100 are thus selectively removable from the media stack 100. In other words, the adhesive bond strength of the at least one adhesive element permits removal of the pleats from the folded, pleated filter media stack 100 by a selective removal device, like the movement member 20 of the instant invention. Further embodiments may omit the adhesive strips 340 an simply provide a very tightly compacted filter media stack 100.

A power source 50 is provided in this exemplary embodiment, here the non-limiting example being shown as two batteries. The power source 50 provides power to the at least one motor 40, in this exemplary embodiment a non-limiting example having two motors, and the controller 60. The exemplary embodiment utilizes a folded pleated filter media 70 stored in one side of the completed housing 200 forming the at least one pleated filter media stack 100, 101, 102 of uncontaminated filter media 72 in the filter media storage area 95. The folded at least one pleated filter media stack 100, 101, 102 is stored and, optionally, the pleats are adhered in at least a portion of the space between the tops or peaks and troughs or valleys of each pleat as noted above.

In an exemplary embodiment, several of the media stacks 100, 101, 102 are provided with a specific pleat density or pleat per inch measurement. The pleats per inch can be, for example and certainly not limited to, between about 0.1 and 10 pleats per inch, particularly between 0.5 and 4 pleats per inch is typical but the concentration of pleats is certainly not limited in this way. The media stacks 100, 101, 102 are stored in the completed housing 200, comprised of at least two frame portions 10, 15. In the exemplary embodiment shown the second frame portion 15 contains leg sections 17, 19 and the filter media stacks 100, 101, 102 contained thereon. The filter media stacks 100, 101, 102 in the exemplary embodiment shown further include sweep bars 205, 206, 207 each separating enough material such that the material between the spaced sweep bars corresponds to a complete change of the material in the exposure slot when deployed. As shown, the first media stack 100 is deployed in the exposure slot 7.

One end of the folded, pleated filter media stack 100-102 is coupled to the second frame portion 15. Thus the folded, pleated filter media stack 100-102 is moved from its compacted position to an extended or operating position to replace the exposed filter media 77. Upon command and operation from the controller 60, the exemplary embodiment of FIG. 1 shows the filter as it has deployed a first media stack 100 along the at least one movement member 20, here the pair of threaded rod screw drives. The movement imparted by the movement member 20 removes the at least one folded, pleated filter media stack 100, 101, 102 from its compact stored state, separating the pre-selected pleats per inch spacing into an operational position across the exposure slot 7. This is done by engaging the at least two frame portions 15, 17, which include an at least one frame portion forming a cartridge containing the filter at least one filter media stack 100, 101, 102 thereon. In the exemplary embodiment this is shown as frame portion 15, however it is understood it could also be frame portion 10 or a further frame portion.

After a determination is made by the controller 60 that a change of media stack 100 is needed, the at least one movement member 20 is engaged by the motor 40 moving the sweep bar 205 and the remainder of the media in the exposure slot 7 through to the containment area 95. The at least one support member 105 is pulled toward the motors 40 in this exemplary embodiment as shown by the arrows denoting movement. The sweep bar or support member 205 in a non-limiting example used in the exemplary embodiment is a plate threaded onto each of the threaded rod screw drives 20. The resulting movement pulls the second media stack 102 and the associated sweep bar 206 along the at least one movement member 20 and moves the media stack 102 from the storage area 95 into the exposure slot 7 to deploy the clean media 72 therein. Of course, this is only one method of operation and several such methods may be utilized to move clean media, for instance those shown herein below in relation to FIGS. 3A-4C. These methods may be utilized to affect a partial or a complete change of the filter material in the exposure slot 7 and move the exposed filter media portion 77 into the containment area 95. The containment area 95 and/or the storage area 90 may also provide a seal (not shown) to help prevent readmission of contaminants when all the filter media in the filter becomes exposed and the media stack contained in the cartridge or frame portion 15 needs to be changed. Again the specific movement can be varied and the at least one media stack 100, 101, 102 may be store in any of the at least two frame portions to form a replaceable cartridge with media stack. The filter media 70 has an unexposed portion that is folded and compactly stored in filter media stacks 100, 101, 102 in the media storage area 95 of the completed frame, the unexposed, folded portion of the filter media 72 when exposed to the flow channel is oriented such that the pleats are matched against collapse and withstand the pressure exerted by the passing flow.

In the exemplary embodiment shown, the completed housing 200 is provided in the exemplary embodiment by slidingly engaging the leg portions 16, 18 of the first frame portion 10 with the channel portions 17, 19 of the second frame portion 15. Thus the filter 1 has a completed housing 200 which contains an at least one motivator or movement device 20, in this instance a threaded rod or shaft or screw drive, having the filter media stack 100 coupled thereto. In this instance, the at least two frame portions 10, 15, contain in one portion the controller 60, the motor 40, the at least one movement device 20, and the power supply 50 in the first frame portion 10. The cartridge containing the at least one media stack 100, 101, 102, is here shown as the second frame portion 15. The elements could equally be swapped or certain components, for instance the power supply, can be located in other of the at least two frame portions 15, 10, as shown herein in relation to the further embodiments below. Likewise the number of media stacks can be varied, providing longer or shorter operational times per cartridge.

Similarly, the specific construction of the elements may be varied to fit design parameters, cost constraints or environmental concerns. It should be noted that the power source 50 is in this case can be an environmentally friendly disposable battery, such as but certainly not limited to a lithium ion battery. Similar alkaline batteries may be utilized, for instance. Additional provisions can also be made for an external power source, such as a plug element or set of electrical connectors (not shown) to engage the filter 1 with a conventional power source or use a conventional battery as well.

Thus together, in the exemplary embodiment shown, the first and second frame portions 10, 15 are combined to form the filter 1 and a completed housing 200. An exposure area, vent, opening, or slot 7 is provided within the completed housing 200, the exposure area 7 being of sufficient size to permit flow from the flow channel to be sent there through. The housing 10 contains an at least one motivator or movement device 20, in this instance a pair of threaded rod screw drives, the movement device 20 being driven by a motor 40 with a power source 50, a controller 60. A filter media 70 is provided to deploy as an at least one pleated, folded, compact filter media stack 101, 102, 103.

The thickness of the filter 1 is specific to design constrains, but typically being a standard width for filters so as to be a replacement in existing filtration applications, such as in air handlers. The thickness can be for example but is certainly not limited to about 0.25 inches to 10 inches, more specifically about one to five inches (1"-5") in thickness for residential and commercial filtration systems. An exposure area, vent, opening, or slot 7 is provided within the multi-section frame formed by combining the at least two frame elements 10, 15, the exposure area 7 being of sufficient size to permit flow from the flow channel to be sent there through. The frame and other components can be, in an exemplary embodiment, for example but certainly not limited to, environmentally friendly stiffened plastics, paper or cellulose product, organic plastic like compounds, or similarly green materials.

The controller 60 selectively powers the motor 40 in each instance to effect a change in the media 70 in the exposure slot 7. In this instance, as described above and further in relation to FIGS. 3A-4C below, the controller 60 may be programmed to advance or a user may advance a first section of the media stack 100 upon engaging the first and second frame portions 10,15. Alternatively, a user may manually thread the media 70 or engage a selection mechanism, such as a button (not shown), to start the filter media stack 100. The controller 60 also advances the media 70 when the media in the exposure slot 7 is full of contaminants. One non-limiting example would be to advance the filter media 70 based on inputs from an at least one sensor 80 in the exemplary embodiment.

In further embodiments, additional non-limiting examples of sensors and/or inputs can include pressure, flow, light, or similar sensors or indicators. The sensors and controller can further communicate with additional elements of the filter or a network or both. The controller 60 can, for example, comprise a printed circuit board having a microprocessor in communication with the at least one sensor 80. The at least one sensor 80 can for instance be a magnetic sensor that determines the position of the filter media 70 based on imbedded magnetic tags in the filter media 70. It can also be a turn counter on a screw drive or a clock or similar mechanism for determining distance and/or time may be utilized as a sensor input 80. Any number of sensors 80 may be utilized to provide sensed input as to the state of the filter media 70 and the operation of the filter 1. In the exemplary embodiment, the controller 60 is activated at installation and tracks days or hours in operation.

Software on the controller 60 determines when these measurements are made and the threshold levels of obstruction or color change on or similar change in a metered variable in relation to the exposed filter media 77. Each of the threaded rod screw drives making the movement members 20 are engaged by their respective motors 40 when initiated by the controller 60. The operation of the controller 60 and the signals of the sensors are further discussed herein below in relation to FIGS. 3A-4C. However, the determination on advancing the filter via the motor 40 may be based on any of the aforementioned manners, including but not limited to a timer or a sensor 80 output/input.

In the exemplary of FIG. 1, the controller 60 can count, for example but certainly not limited to, up to three months and activate the motivator or movement device 20, in this case the threaded rod or shaft, with the at least one motor 50. In such an exemplary embodiment shown in FIG. 1, the length of the filter media 70 paid out may be monitored by a counter or other device based on the number of revolutions of the at least one movement device 20 or based on the aforementioned magnetic tags or similar devices. In a further exemplary embodiment, the sensor input 80 can be in communication with the controller 60 that can determine the position of the media filter 70 and stop when a "clean" element or measured portion of filter media 70 is in position, for example one of the at least one media stacks 100, 101, 102. The controller 60 can also be used to sense a condition of the air, the filter media 70, or a combination of both through communication with the at least one sensor 80. The controller 60 can also be used to advance the at least one movement member 20 based on the sensed conditions or as a timed or pre-programmed operating profile or based on sensor data in further embodiments Thus, in the advance of the threaded rod or shaft of the at least one movement member 20 the first of the at least one sweep bars 205 the at least one filter media pack pays out or unfolds the uncontaminated filter media 72 on a first or feed side including a containment area 95. To aid in the operation of this embodiment and the differences with other embodiments, this side is designated by "A" in FIG. 1 on the completed housing 200. While simultaneously on the opposite side, a filter media take-up compartment or containment area 90 is located on a second or take up side, designated by "B" in FIG. 1 collecting the spent or contaminated filter media 75 in a designated containment area 95.

Figure 2A:
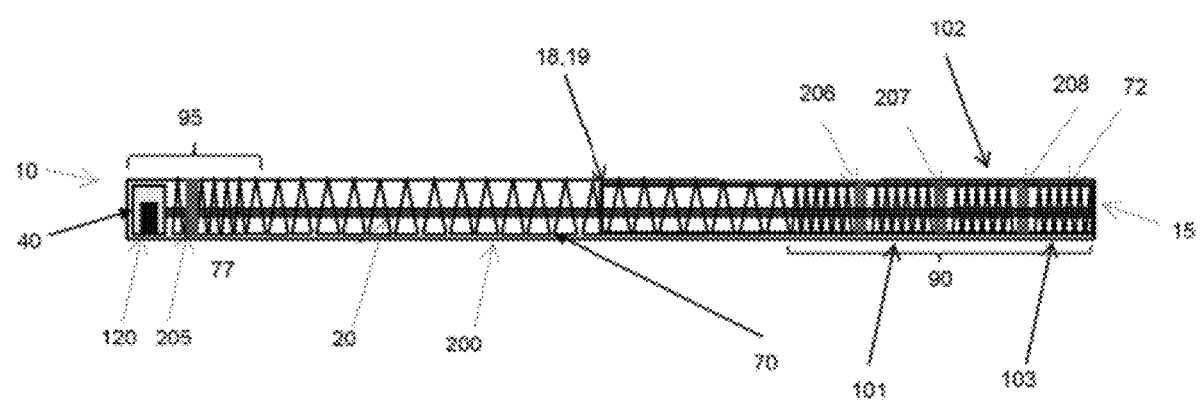
FIG. 2A shows a side view of the embodiment of FIG. 1.

FIG. 2A shows a side view of the embodiment of FIG. 1. As seen in the side view, the at least one filter media stack 100, 101, 102 is provided with the at least one sweep bar 205, 206, 207, 208 on one side of the filter 1 within the second frame portion 15. The completed filter frame 200 being engaged through the sliding engagement of leg portions 17,19, on a second frame portion 15 and channel sections 16, 18, on first frame portion 10, it should be noted that the side view shows only elements 18, 19 but is mirrored on the other side by elements 17,16. The controller at least one motor 40 is shown and engages and drives the at least one movement member 20, here shown as a screw shaft or threaded rod which engages the at least one sweep bar 205-208 in this exemplary embodiment. The at least one sweep bar 205 is shaped such that it engages the at least one movement member 20, here the threaded rod or screw shaft. Further embodiments provide various shapes to facilitate stacking and or move the support or sweep bars 205-208 to non-threaded portions of the rods for storage. However, in this instance, the threads are continued into the containment area as shown. The filter media 70 is folded such that there are just enough residual pleats at the end of the span of filter media 70 in the change being drawn out with the first of the at least one sweep bars 205 such that the second of the at least one sweep bars 206 is drawn onto the at least one movement member 20 and continues to be fed out as the second change of the filter media 70 in the filter 1.

Additional movement members can include for example an at least one cord, wire, string, set of pinch rollers, star roller, star gear, toothed roller, worm drive, or similar device or devices to move the folded, pleated filter media 70 from the media stack 100 and into the exposure slot 7. Additionally, the position of the screw drive or threaded rod can also be above or below the pleated material, such that the pitch of the screw drive or threaded rod can move the individual pleats in the exemplary embodiment shown in FIG. 1. Similarly, the at least one movement member 20 can run through the filter media and be used in conjunction with or without a support member or other device such as the sweep bars 205-208 shown in the exemplary embodiment.

In the instant embodiment the contaminated filter media 77 is folded on itself and thereby stores and captures the collected particulate matter in storage area 90. In additional embodiments, the contaminated filter media 77 is contained in a containment area 90 having a seal (not shown) to retain the contaminated filter media and any captured contaminants. In both cases, the contaminated filter media 77 is being collected within the containment area 90 and further within the completed housing 200 so as to minimize exposure for reintroduction of the contaminants from the exposed or contaminated filter media 77 and, simultaneously, preventing contact of the containments with the operator or the environment during replacement. The filter media 70 is provided with a greater amount of filter material 70 stored in the filter media storage area 75 than existing rigid frame, stationary filters, allowing for extended life. For example, sufficient uncontaminated filter 72 media can be provided to make for example a multi-month, six or twelve month for example, filter. In other embodiments, several changes or cycles of filter media may be stored and utilized, such as in the exemplary embodiments described herein below with magazine cartridges.

Once the uncontaminated filter media in the filter media stack 100 is emptied or the last available change of filter media has been spent, the controller can activate an indicator element 120. The indicator element can be, but is not limited to an audible alarm or visual indicator element or LED. Similarly, a scent material may be utilized on all but the last piece of the uncontaminated filter 72 media such that the absence or presence of the scent is an indicator that the filter needs to be replaced. Either after a specified time period or once the indicator element 120 is activated, the user simply removes and replaces the cartridge or second of the at least one frame portions. The spent or contaminated filter media 77 is contained and the re-admission of the filtered contaminants is minimized, as described in more detail in regards to FIGS. 3A-4C showing the operation of the exemplary embodiment in FIG. 1. The expired filter media stack 100 can then be safely disposed of with minimal environmental impact.

Figure 2B:
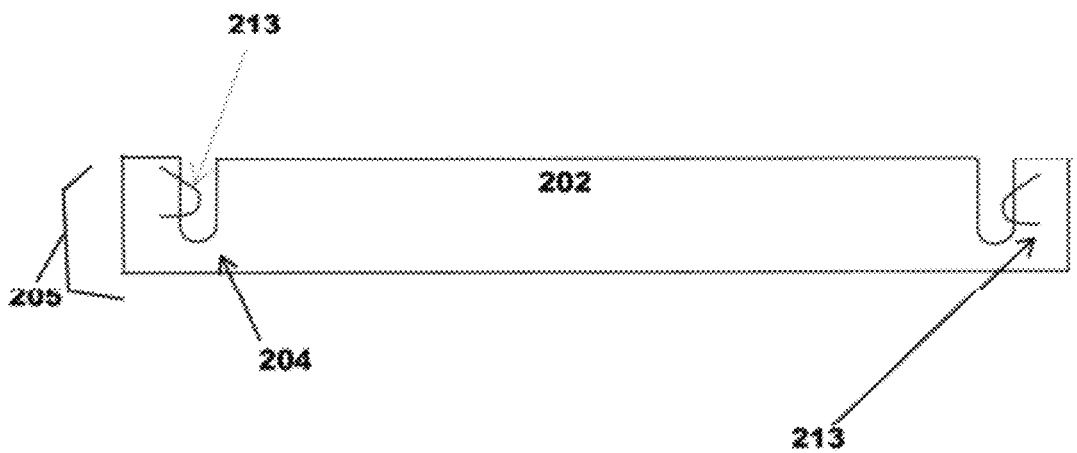
FIG. 2B shows a sweep bar as used in an exemplary embodiment of the instant invention.

FIG. 2B shows a sweep bar as used in an exemplary embodiment of the instant invention. As seen in FIG. 2B, the sweep plate is generally rectangular as shown, however a circular or ovoid shape is also contemplated as is a flat bar. The sweep plate 205 has a body 202, with two guide ports 204. The guide ports 204 may be circular or may be horseshoe or U shaped as shown. Guide ports 204 that are U-shaped may also be provided with a spring member 213 to aid in retaining the sweep arm 205 on the movement element 20. The guide ports 204 typically match with the number of movement members 20 and engage them for movement in the frame 1. The guide ports 204 may also be threaded themselves to match the thread or screw pitch on the threaded rod or screw drive in FIG. 1. Similarly, the sweep bar 205 may be similarly shaped or otherwise adjusted to engage with any of the listed movement members. The sweep bars 205 connect the charges of clean filter media 70 for each change within the frame 1. When the first sweep bar is advanced it unfolds the clean filter media 70 from the stack. In an exemplary embodiment, a small amount of adhesive is used to keep the folded, pleated clean filter media in the stack. The movement member detaches the adhesion in this exemplary embodiment. In further embodiments, the folded, pleated filter media may be mechanically held or otherwise held in place with the movement device releasing the clean filter material. The operation of the exemplary embodiment is further described in relation to FIGS. 3A-3C and FIGS. 4A-4C herein below.

Figure 3B:
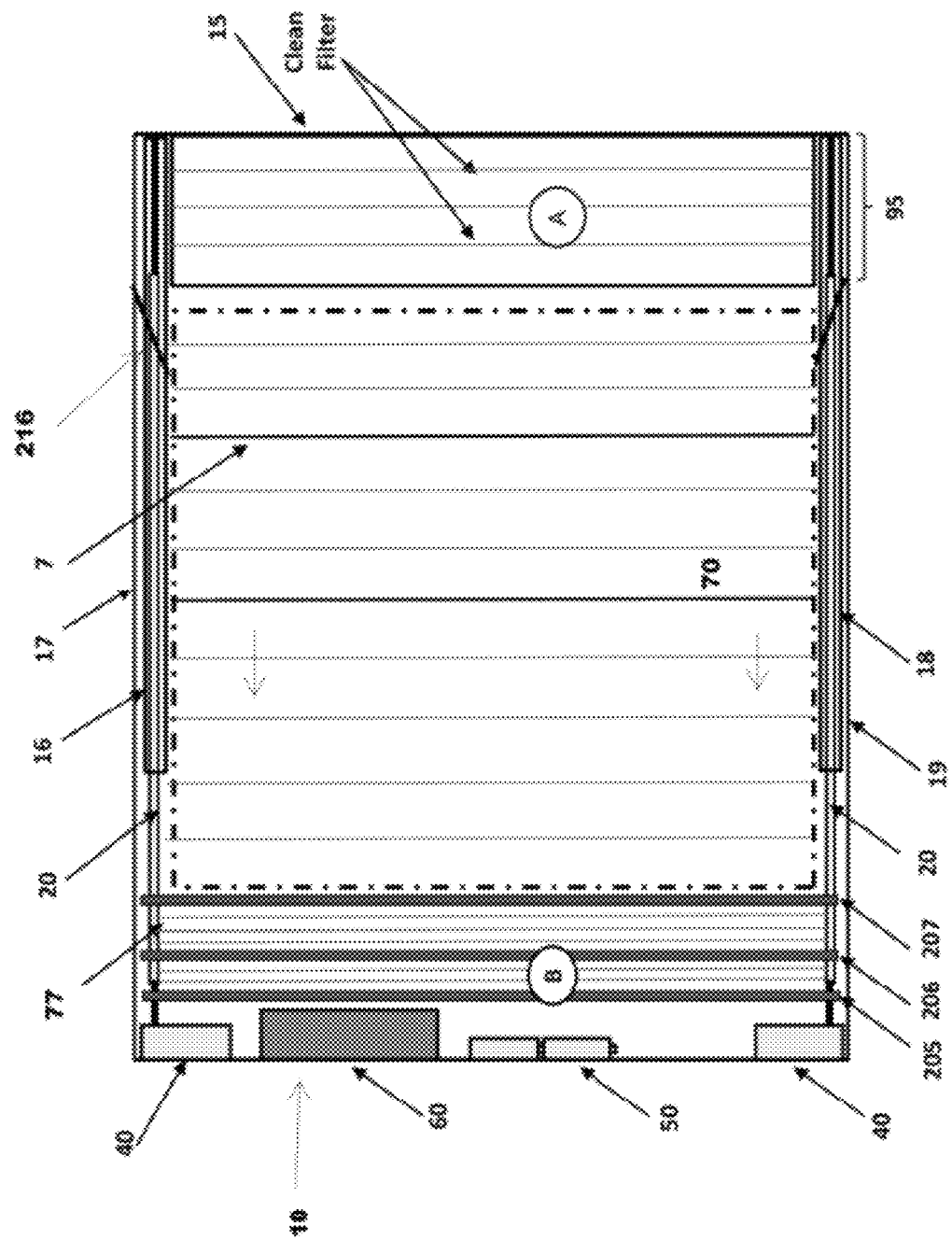
Figure 3C:
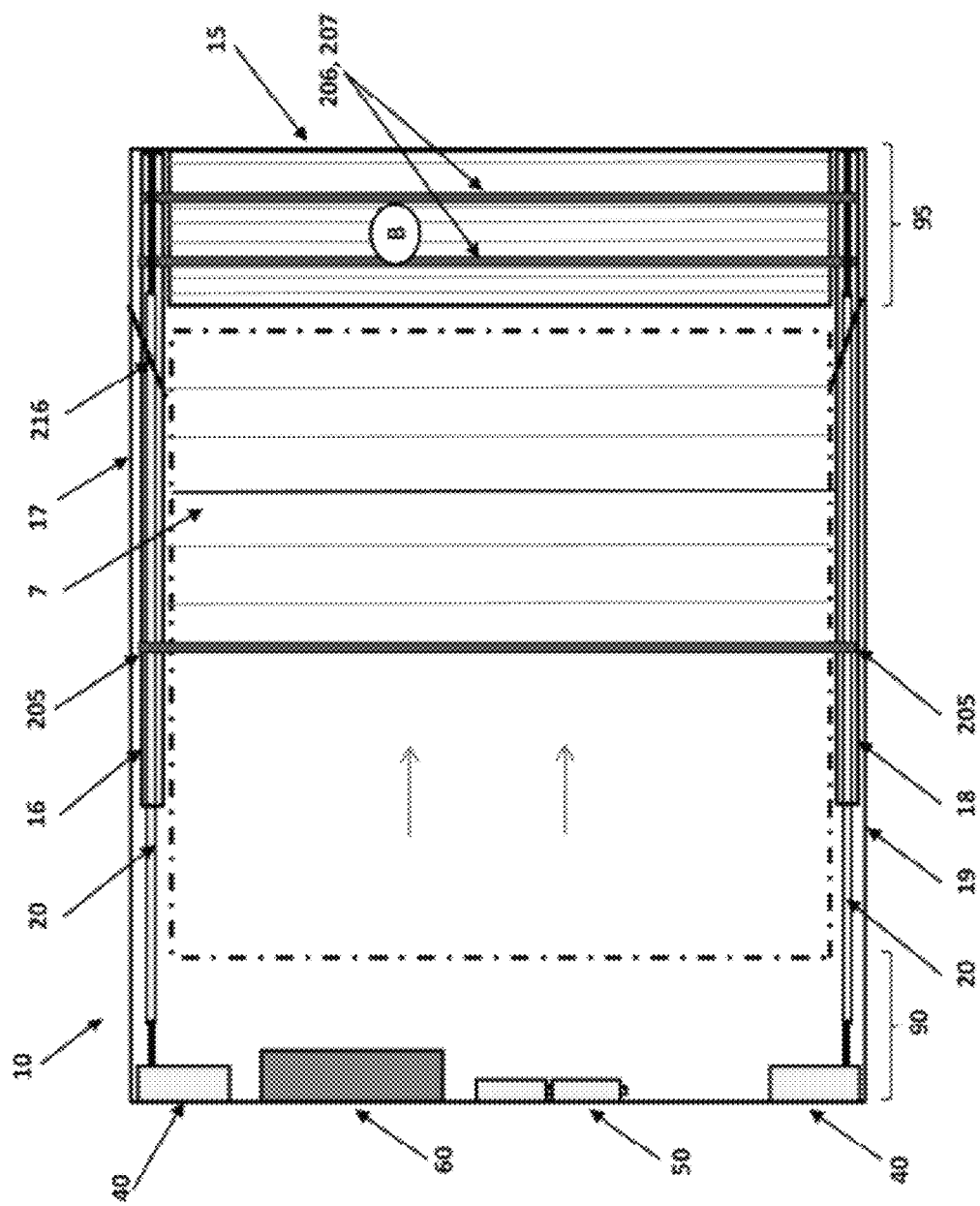

FIGS. 3A-3C shows the operation of the embodiment of FIG. 1. In the FIG. 3A, the first and second of the at least one frame portions 10, 15 are joined as described above to form the completed housing 200. The media is in the second portion 15 is provided as a media stack 100 with multiple sweep bars 205, 206, 207 segmenting the media stack 100 into charges or cycles or the amount of filter media 70 sufficient to be used in the exposure void or slot 7. In FIG. 3A the media stack is mounted such that the first change of media and the first sweep bar 205 is queued up on the movement member. In this instance, the controller 60 can be instructed, for instance through a push button user input, to begin the advance of the new media stack 100 for the cartridge. Alternatively, the filter media stack 100 may be manually engaged with the at least one movement member 20 during installation. A sealing member 216 can be provide to help prevent admission of contaminants. The media stacks move from the storage side "A" to the containment side "B", the final process before removing the cartridge bringing the exposed media back to storage side "A" for final removal.

FIG. 3B shows the filter media 70 being moved out of the exposure slot 7 and the third change or cycle of material being advanced with the second sweep bar 206 into and across the exposure slot. The exposed filter material 77 is then stacked, refolding the material at its pleats and compressing same. The folded, pleated filter media is unstacked and moved into the exposure slot 7 by the at least one movement member while maintaining the pleat spacing or PPI in the exemplary embodiment. The material in this exemplary embodiment is coupled to the sweep bar 205, 206, 207 and the advancement of each bar extends a new cycle of material into the exposure slot 7, as noted above. The movement member and method of moving the filter material may be varied, and is well within the scope and spirit of the invention. Two exemplary, non-limiting methods are provided herein below as shown in FIGS. 3A-3C and 4A-4C, however, additional methods may be utilized to provide the necessary movement of the filter media stack 100 from the compressed/stored state to a deployed state in the filter 10. The at least one movement member 20 in this instance is a threaded rod that engages the sweep bar 205, 206, 207. A small non threaded rod or portion of the same rod may be used to store the non-advancing sweeper bars 205, 206,207 as shown. Similarly, within the collection of the spent filter media, a similar non-threaded member on the end of the media for storage, as shown in shadow.

FIG. 3C shows the completed filter being backed out and the media stack 100 being reformed for disposal. The final cycle or change of clean filter material 70 for the exposed media filter 77 is shown in this instance. The movement member 20 is reversed, as shown by the arrows, and the material is returned to the state from which it started and can be removed and replaced. The second frame portion 15 is removed from the first frame portion 20, the leg portions 16, 18 are slid out from the channel portions 17, 19 and a new media pack 100 in an identical second frame portion 15 is installed and the process repeated.

Figure 4A:
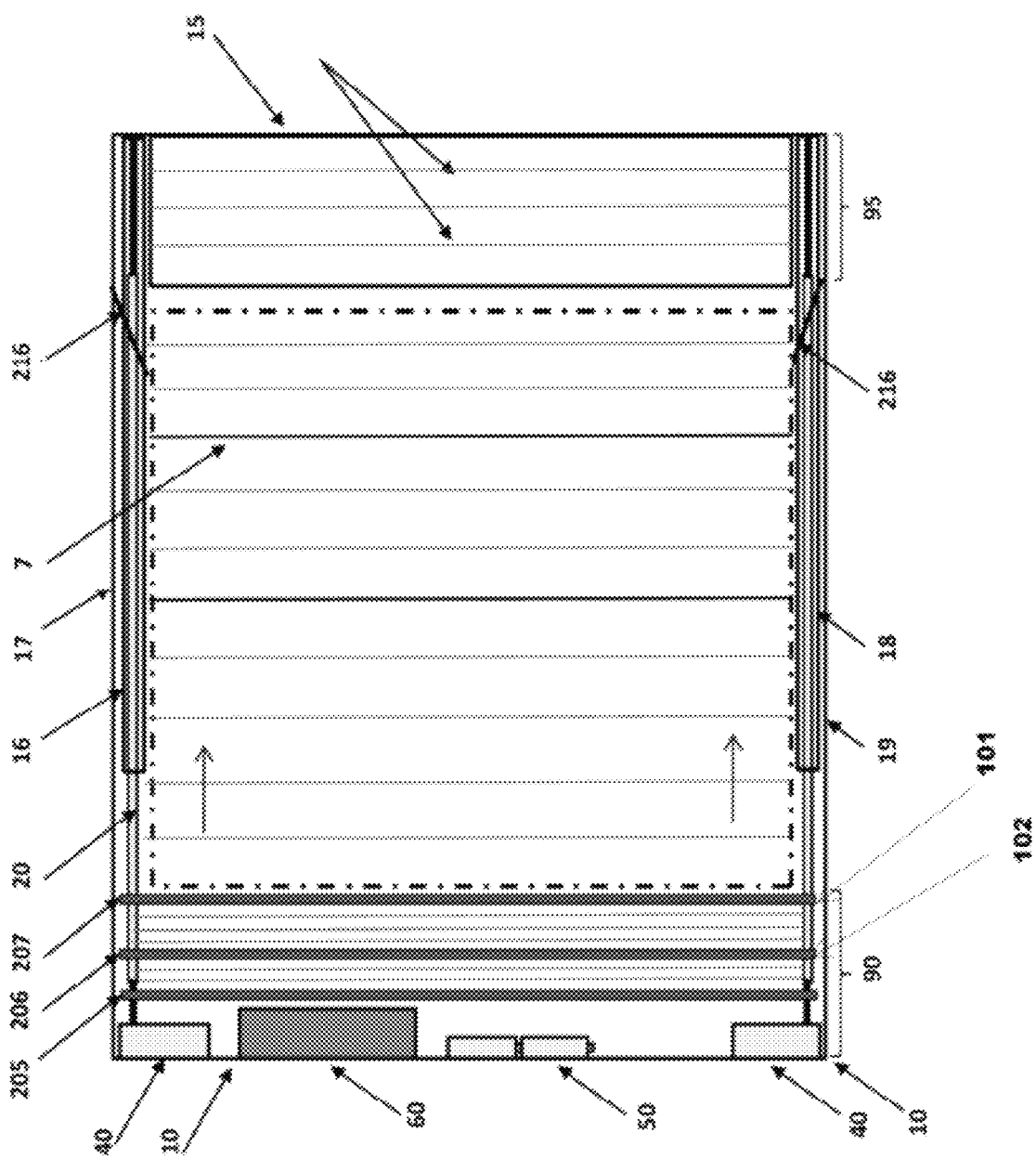
FIGS. 4A-4C show the operation of a further exemplary method of operation of the exemplary embodiment of FIG. 1.
Figure 4B:
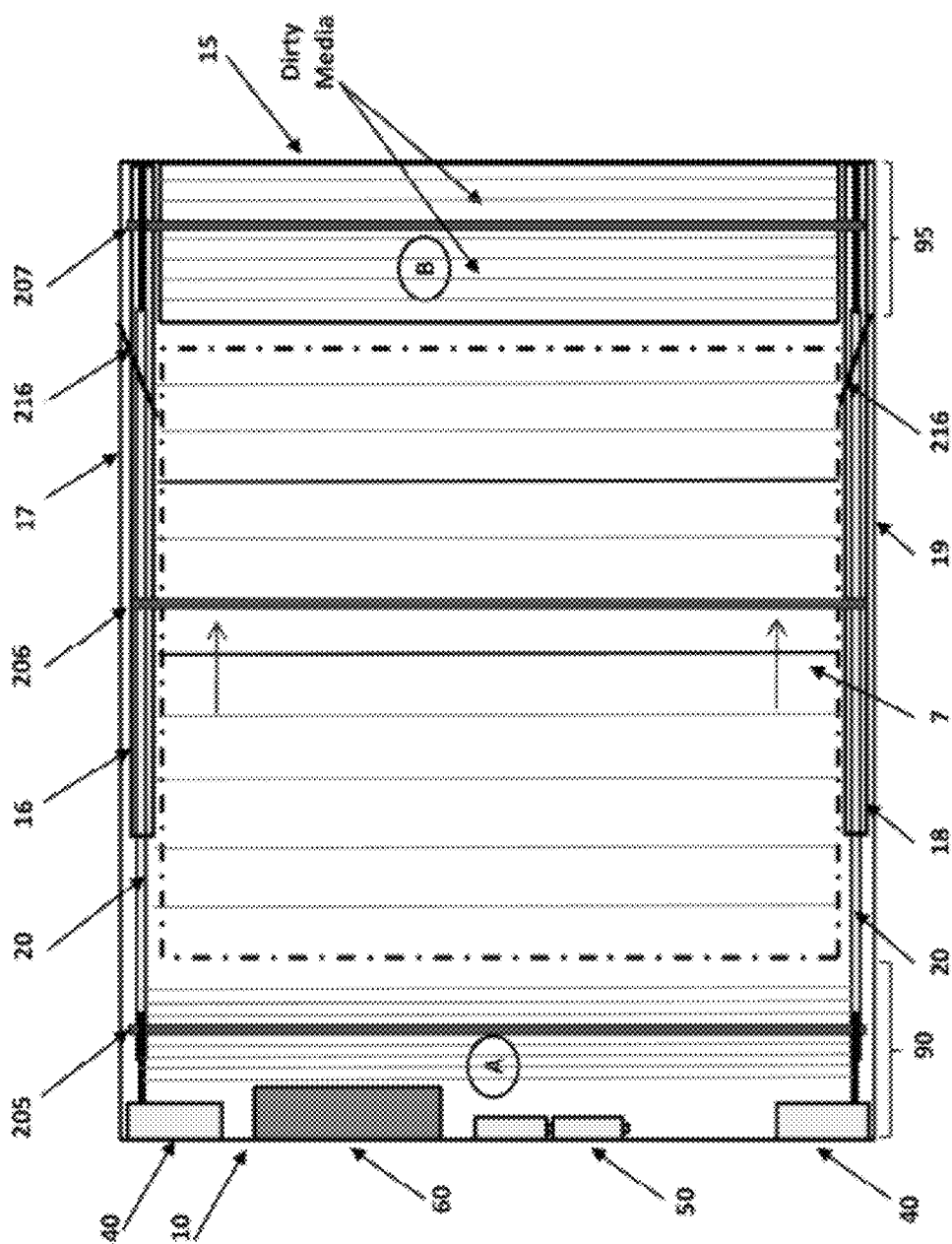
Figure 4C:
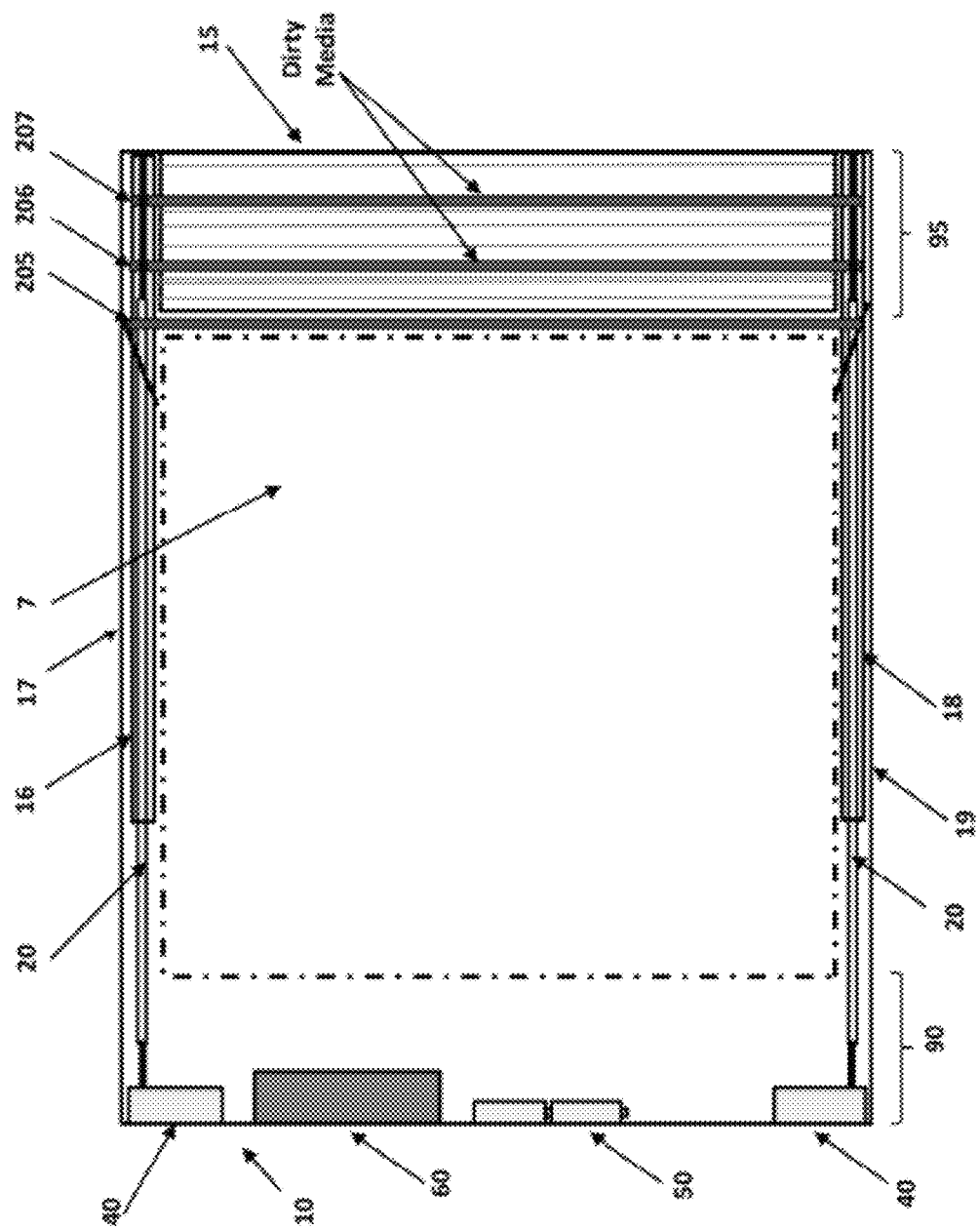

FIGS. 4A-4C show the operation of a further exemplary method of operation of the exemplary embodiment of FIG. 1. As shown in FIG. 4A, the filter 1 is substantially the same as that used in FIG. 3A. The filter media stack 100 in the second frame portion 15 is installed in the same fashion as that shown in FIG. 3A. Again, the controller 60 may load the material by engaging the at least one motor 50 to advance the at least one movement member 20 to engage the filter media stack 100 and queue the first sweep bar 205. However, unlike the exemplary embodiment of the method of operation of FIG. 3A-3C, the media is first moved across the filter 1 in this instance in its entirety.

FIG. 4B shows this principal operational difference. In this instance, the entirety of the media stack 100 is removed from the installation position shown in FIG. 4A and all the sweep bars 205, 206, 207 are moved across the filter 1, effectively moving them from the second frame portion 15 onto the first frame portion 10. In this way the first exposed portion is the last exposed portion in the previous method of operation. The filter media 70 is restacked as a filter media stack 100, 101, 102 on the opposing side in the side labeled "a" and referred to as the storage area 90. It is then moved back toward its starting position as shown in FIG. 4C. The movement is again A to B, but this movement is reverse from that seen in FIGS. 3A-3C.

FIG. 4C shows the final movement of the last sweep bar 205 back into the starting position having exposed all the charges or cycles or changes in the media pack 100. The final sweep bar 205 is moved across the filter 1 width and stacked and stored. In this manner the second frame portion 15 is likewise removed and replaced bringing a clean filter media stack 100. Effectively, this returns the media stack to its starting position, the same as that shown in FIG. 3A. The media stack 100 can be sealed off by a sealing member (not shown), an exemplary embodiment being a rubberized gasket or similar material or other sealing element.

FIG. 5 shows a top/isometric further exemplary embodiment of the instant invention having a cartridge with a filter media stack therein. In the exemplary embodiment shown a filter cartridge 301 is shown inside a frame 305. The frame 305 can be constructed of stiffened cardboard or a more durable material such as a plastic or metal. The frame 305 in the exemplary embodiment shown in FIG. 5 contains an at least one motor 40 with a power source 50, and a controller 60. The motor 40 is coupled to the movement device or element 20 through a coupling 320 that penetrates through the exterior of the filter cartridge 301.

As seen in FIG. 5, the filter cartridge 301 is separate and apart from the frame 305 and the filter 1 requires assembling these two pieces together. In addition to the coupling 320, the filter cartridge 301 in this exemplary embodiment includes the movement device 20, here two threaded rods or screw drives. The movement device 20 engages a filter media stack 100 stored in the filter cartridge 301. The operation of the filter 1 is thereafter similar to the other embodiments described herein, whereby the filter media 70 is separated into distinct media stacks 101, 102, 103 with sweep bars 205, 206, 207 in storage area 90 is reduced and changes of the filter media 70 in an exposure slot 7 are accomplished, with the filter media being restacked as a folded, pleated, exposed filter media stack in the containment area. In this instance, this occurs all within the filter cartridge 301. The exposed filter media 77 is restacked within the filter cartridge in containment area 90. It should be noted that any of the previously disclosed drive mechanism or those that would be obvious to one of ordinary skill in the art can be used to move the filter media 70 from the filter media stack 100.

FIG. 6 shows an assembled filter of the exemplary embodiment of FIG. 5. The filter cartridge 301 is shown secured inside the frame 305. A securement coupling 330 is provided to secure the filter cartridge 301 inside the frame 305. The securement coupling 330 here is shown as a pair of securement couplings 330, for instance a pair of metal springs or sliding metal members that can be deployed after assembly of the filter 1. The securement coupling 330 can also be an additional cross-member or a friction fit element, so long as the filter cartridge 301 is secured in the frame 305 and the motor coupling member 320 is engaged to allow for operation of the filter 1. The securement coupling 330 may be optional or incorporated into the geometry of the filter cartridge 301 and the frame 305 such that the insertion of the filter cartridge 301 into the frame 305 secures the filter cartridge 301 and engages the motor coupling member 320.

Figure 7A:
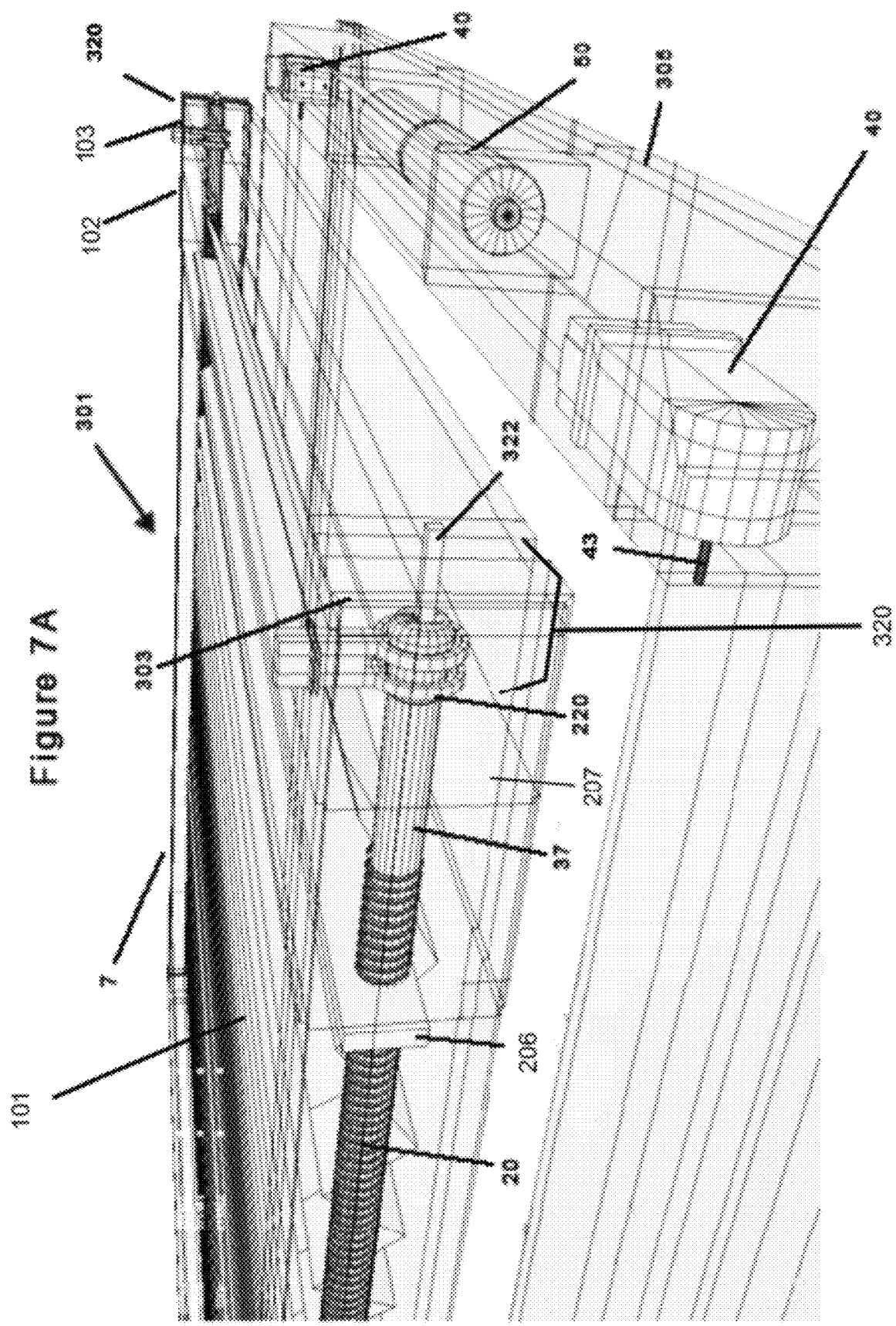
FIG. 7A shows an exemplary embodiment of the motor coupling member that engages the at least one motor in the exemplary embodiment of the filter of FIG. 5.

FIG. 7A shows an exemplary embodiment of the motor coupling member that engages the at least one motor in the exemplary embodiment of the filter of FIG. 5. As seen in FIG. 7A, the frame 305 is shown in shadow providing a view of the filter cartridge 301 which is shown approaching the frame 305. In this instance, a motor coupling member 320 is shown as a male protrusion 322 extending from the end of the movement member 20, here a threaded rod. The male protrusion 322 is in a slot 303 within the filter cartridge 301. The slot 303 matches an extension shaft 43 extending from the motor 40. The slot 303 slides around the extension shaft 43 and a female receiving portion 47 in the extension shaft 43 mates with the male protrusion 322. Once the male protrusion 322 and the extension shaft 43 are engaged, the motor 40 can drive the extension shaft 43 and thereby drives the movement member 20, here threaded shaft screw drive, when power is provided by the power source 50. This moves the filter media 70 from the filter media stack 100 in the fashion described above. The various filter media stacks 101, 102, 103 are moved across the exposure slot 7, the previous media stack being separated by a sweep or spanning or separating member 205, 206, 207 respectively. Each sweep member 205, 206, 207 pulls the previous member further along a non-threaded portion 37 of the drive member 20 as shown until it is engaged on the threads. The advancement of the media stacks is controlled by the controller as described herein.

Figure 7B:
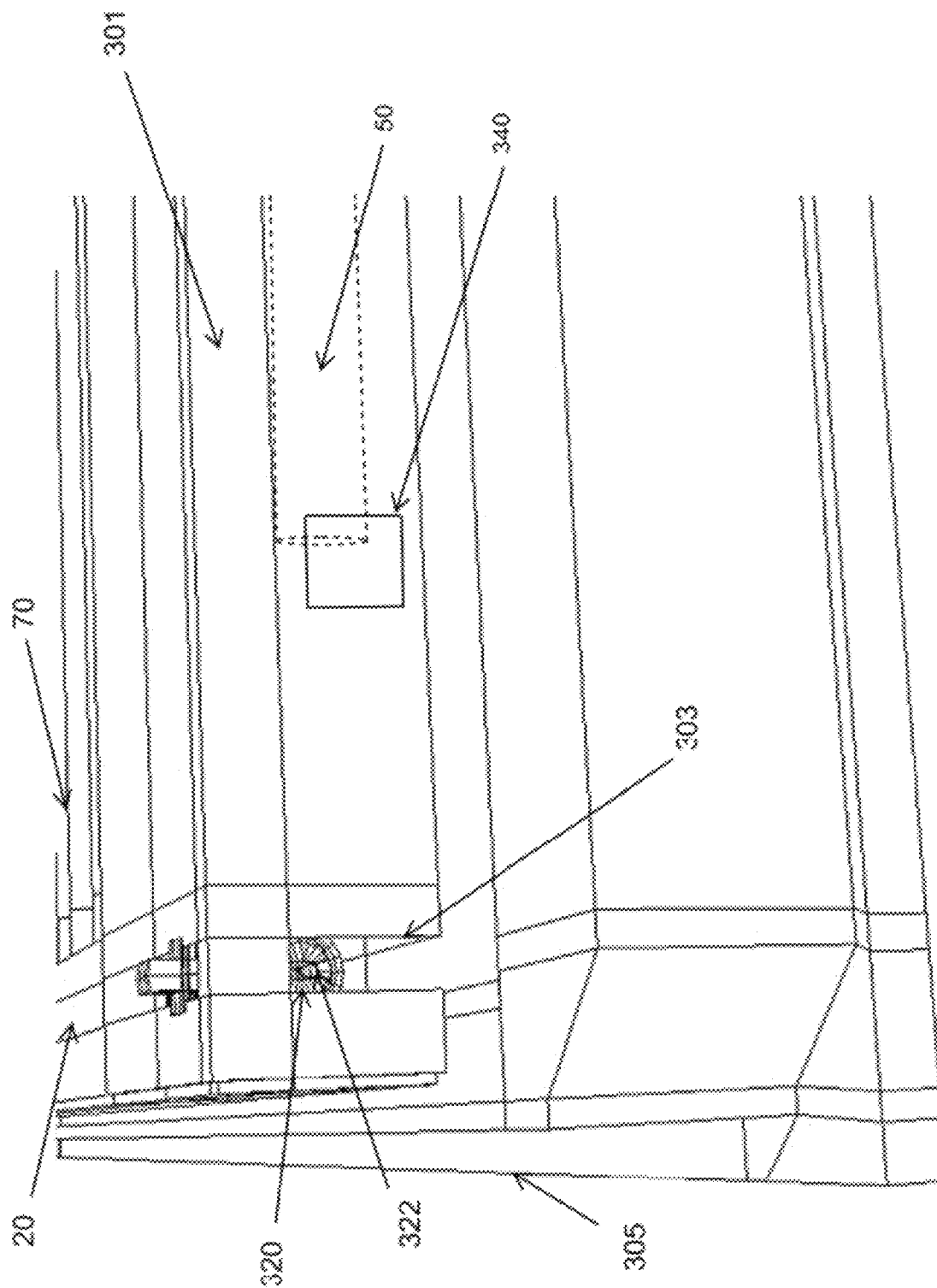
FIG. 7B shows a further exemplary embodiment of a filter similar to the exemplary embodiment shown in FIG. 5.

FIG. 7B shows a further exemplary embodiment of a filter. FIG. 7B shows a variation on the embodiment shown in FIGS. 5-7A, having a similar filter cartridge 301 and a frame 305 in which the filter cartridge 301 is secured. A similar slot 303 is provided with male protrusion 322 for forming coupling 320 to engage with a motor (not shown). The filter cartridge 301 differs in that the power source 50, shown as batteries, is moved from the frame 305 into the filter cartridge 301. Additional components provide electrical coupling of the power source 50 to the at least one motor 40. In this instance, the batteries are the power source 50 and these are coupled to an at least one battery contact 340. The battery contact 340 has a matching at least one motor contact (not shown). These can be for instance typical electrical metal contacts which electrically couple the motor 40 and the power source 50. This facilitates changing the power source 50 when driving movement member 20 and changing the filter media 70.

FIGS. 8A and 8B show isometric views of a still further exemplary embodiment of the instant invention having a cartridge with a first media stack inline and an additional vertical filter media stack. FIG. 8A shows an exemplary embodiment of a replacement extended life filter 1 is provided. The exemplary embodiment of FIG. 8A shows a frame or housing 10 with a supply cartridge 150 and a collection cartridge 180. The supply cartridge 150 and the collection cartridge 180 are removable from the frame 10. They are held in place with coupling members 800. In this embodiment, these are simply releasable straps. Other non-limiting examples of coupling members can include snaps, buckles, interlocking parts slidingly engaged, clasps, or similar mechanisms to selectively release the cartridges 150, 180. These and any other appropriate coupling device is well within the spirit of the invention.

In this embodiment, a full first stack of folded, pleated media stack, shown already extended in FIGS. 8A and 8B, it initially extends in the same plane as the frame or housing 10 with a sweep bar 205 coupled and moved to one end. This initial media stack 101 is advanced as shown and a further media stack 102 having a sweep bar 206 is pulled down from the vertical magazine or supply cartridge 150. Although both cartridges are shown on a single side, variations in the orientation of the magazine in the vertical, i.e. above or below the frame with the exposure slot, is fully contemplated. In particular, it may be advantageous utilize the force of gravity to assist in feeding or removing/collecting the filter stacks. As such, the embodiment shown is a non-limiting exemplary embodiment.

An at least one guide member (not shown) can be added to assist in advancing the folded, pleated media stack 102 downward. As seen in FIG. 8A, the initial media stack is deployed and has been effectively used and the controller 60 is advancing the at least one movement member 20 to effectuate a change of the media 70. The media stack 102 is being deployed as the sweep bar 206 is being moved along the at least one movement member 20, here a single threaded shaft in the center and two screw drives on either side. A further media stack 103 is provided with sweep bar 207 and media stack 103 for a further change after the media stack 102 is exposed.

The first media stack is being withdrawn into the collection cartridge 180, as the sweep bar 205 is driven along the middle threaded shaft and upward onto a further guide member 5. The collection guide member 220 may simply be a non-threaded portion onto which the exposed filter media stack 77 is drawn onto. It can also be coupled to the drive shaft through a universal joint, such as a spring member, in such a fashion as to continue to provide a driven motion to the sweep bar 205 and thereby continue to assist in repacking the exposed filter media 77 in the collection cartridge. Additionally, the collection cartridge 180 can have a sealing member (not shown), a non-limiting example being for instance a rubber gasket, to aid in sealing off the collection area and avoid recontamination or release of contaminants upon removal. FIG. 8B shows substantially the same embodiment but utilizing only a set of threaded rods as the at least one movement member 20.

The operation of the embodiment shown in FIGS. 8A and 8B functions similar to those previously described. For brevity, reference will be made to similar steps and some steps are abbreviated, but reference is made to the previous methods of operation and there steps are equally functional herewith. In operation, the frame 10 is coupled to a supply cartridge 150, the initial media stack (shown in deployed form) being supplied and extending below the supply cartridge 150 in the same plane as the frame 10. The media stack has a sweep bar 205 which is engaged by the at least one movement member 20, here for instance a central threaded rod, which begins to advance the media 70 from the media stack. The media stack is deployed across the exposure slot 7. The media 70 is exposed to the flow in the flow channel. The controller 60 is signaled or signals a media change. The media change is commenced and a further media stack 102 is drawn from the supply cartridge 150 and sweep bar 206 is advanced to draw the media 70 from the further media stack 102. As further media stack 102, 103 are withdrawn, the exposed media stack is collected and restacked in the collection cartridge 180.

FIG. 8C shows a further isometric view from below of the collection cartridge of the exemplary embodiment of FIG. 8B. As shown in FIG. 8C, the at least one movement member further includes a driven threaded shaft 211 along the bottom of the frame 10 as well. The figure shows that the threaded shaft 211 that is part of the at least one movement member 20 is bent and does have a spring member 5 that bends upward to provide further guide member 220 providing locomotion. The sweep bar 205 is shown being lifted into the collection cartridge 180 together with the exposed pleated filter material 77.

FIG. 9 shows an isometric of a still further exemplary embodiment of the instant invention having a cartridge with a first media stack inline and a magazine cartridge with multiple vertical filter media stacks therein. Again, similar to the exemplary embodiment of the replacement filter shown in FIG. 8A-8C, the exemplary embodiment of FIG. 9 shows a frame 10, exposure slot 7 with a supply cartridge 150. However, in the supply cartridge of the embodiment shown, there are 3 stacks of folded, pleated, filter media 101, 102, 103, separated by sweep bars 205, 206, 207 respectfully sitting atop an initial media stack which is shown as deployed in the frame.

As with previous embodiments, the first media stack is engaged by a movement member. A non-limiting example of the movement member 20 can be, for example, a thread rod screw drive or a string pulley drive or similar. The at least one media stack, 101, 102, 103 are expanded by the movement member 20. The additional media stacks 101, 102, 103 are coupled to one another through the sweep bars 206, 207 such that the end of one stack is coupled to the respective sweep bar which is also coupled to the start of the next stack. In this way the stacks are drawn out of the supply cartridge 150. The embodiment is then operated in the same fashion as the previous embodiments, moving the filter material from the media stacks through the exposure slot and stacking them in the collection cartridge 180.

Figure 10:
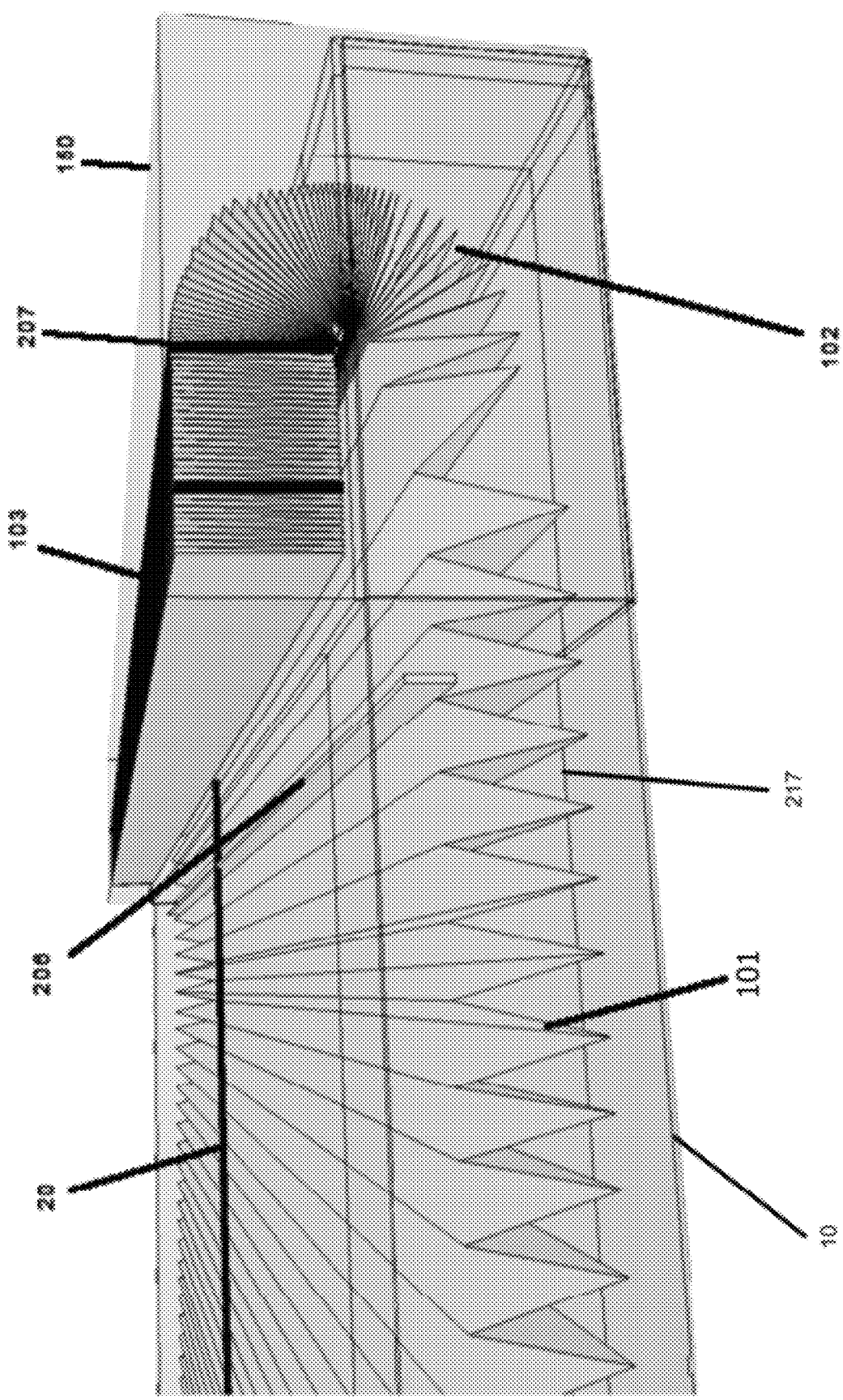
FIG. 10 shows a side cutaway view of another exemplary embodiment having a media stack that wraps into a U shaped magazine.

FIG. 10 shows a side cutaway view of another exemplary embodiment having a media stack that wraps into a U shaped magazine. Again, similar to the exemplary embodiment of the replacement filter shown in FIG. 8A-9, the exemplary embodiment of FIG. 10 shows a frame 10, with a supply cartridge 150. However, in the supply cartridge of the embodiment shown, the media stacks 101, 102, 103 are contained in a U shape supply cartridge 150 end to end with the sweeper bars 205, 206, 207 coupled thereto. The advancement of the media deployed in the exposure slot draws the material out and around in the U shape supply cartridge 150. In this way the stacks are drawn out of the supply cartridge 150. In addition, movement member 20 is shown as a screw drive atop the media 70 together with a driven cord 217. The embodiment is then operated in the same fashion as the previous embodiments, moving the filter material from the media stacks through the exposure slot and stacking them in the collection cartridge.

Figure 11A:
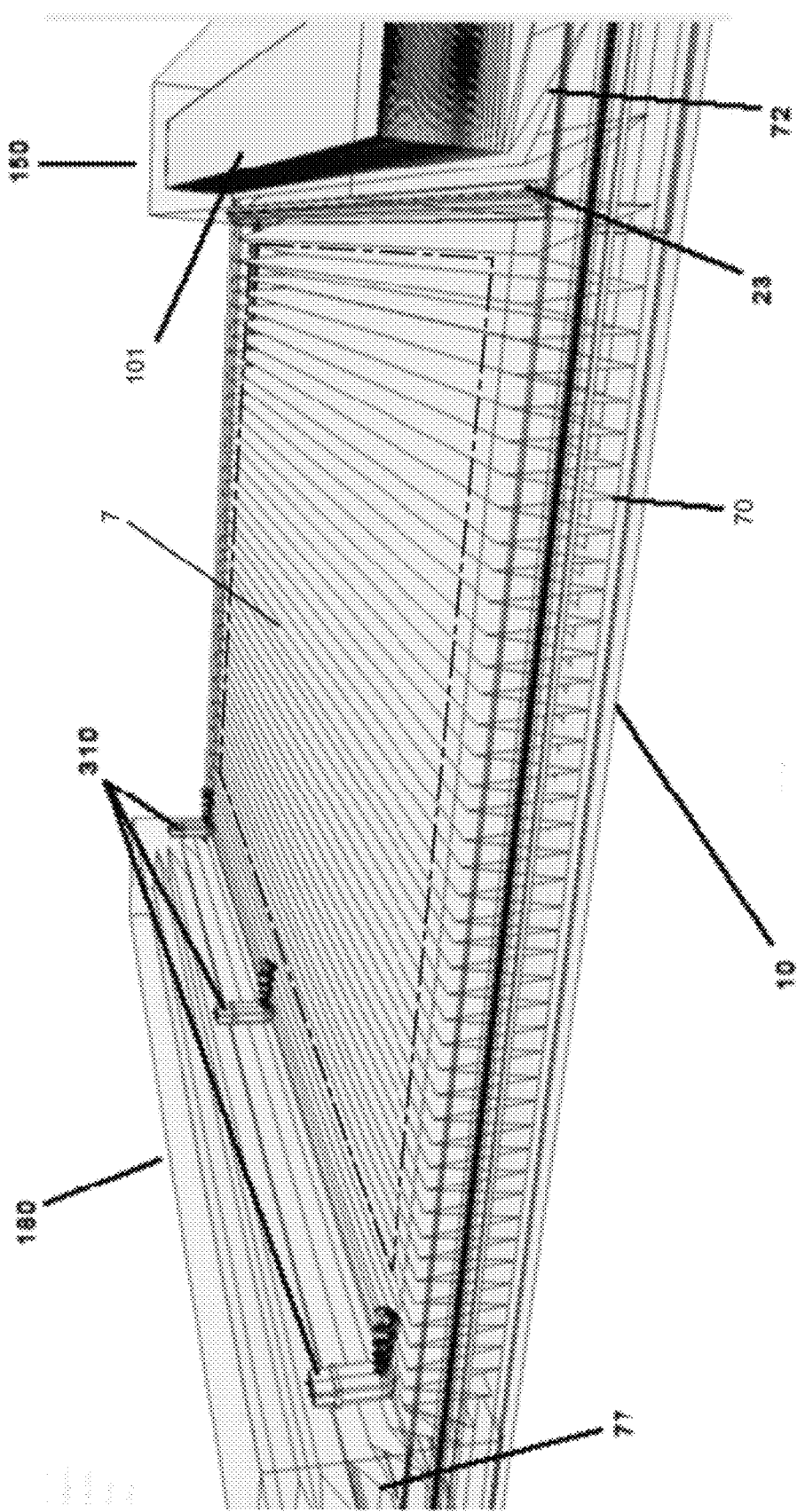
FIG. 11A shows an isometric view of a yet further exemplary embodiment having a rotary movement member to deploy a filter media stack and rollers to assist in guiding the folded, pleated filter media.

FIG. 11A shows an isometric view of a yet further exemplary embodiment having a rotary movement member to deploy a filter media stack and rollers to assist in guiding the folded, pleated filter media. The embodiment shown is similar to the embodiment of FIG. 9 having a frame 10 with an exposure slot 7, a supply cartridge 150 and a collection cartridge 180. The controller, at least one motor and similar components are also present but not shown for the sake of brevity and clarity. In the embodiment shown, the at least one movement device is a star wheel or paddle wheel 23 with further shortened auger screw drives 310 that are near the containment or collection end of the filter 1. Further embodiments may include alone or in part an at least one of cord, wire, or string; track, puller or pinch roller, star, toothed, or pin roller; screw drive and/or threaded rod; take-up roller or similar drive member providing movement of the media 70 from a media stack 100 to an operational position.

Although shown here for use in this embodiment, the disclosed at least one movement device can also be utilized with any of the other exemplary embodiments of the invention as disclosed herein. In this instance, the stack of media 101 stored in the supply cartridge is moved from the stored folded, pleated stack 101 into the filter 1 and across the exposure slot 7 by the movement of the star wheel 23. Further motive force is provided by the auger screw drives 310 which also push the exposed media into the collection cartridge 180. Thus, the embodiment of FIG. 11A moves the folded, pleated media stored in a supply cartridge 150 in a folded, pleated filter media stack 101 into the frame 10 and the exposure slot 7, exposes the filter media 70 to a flow to remove contaminants, and moves the exposed media to a collection cartridge 180 where it is collected and stacked again.

Figure 11B:
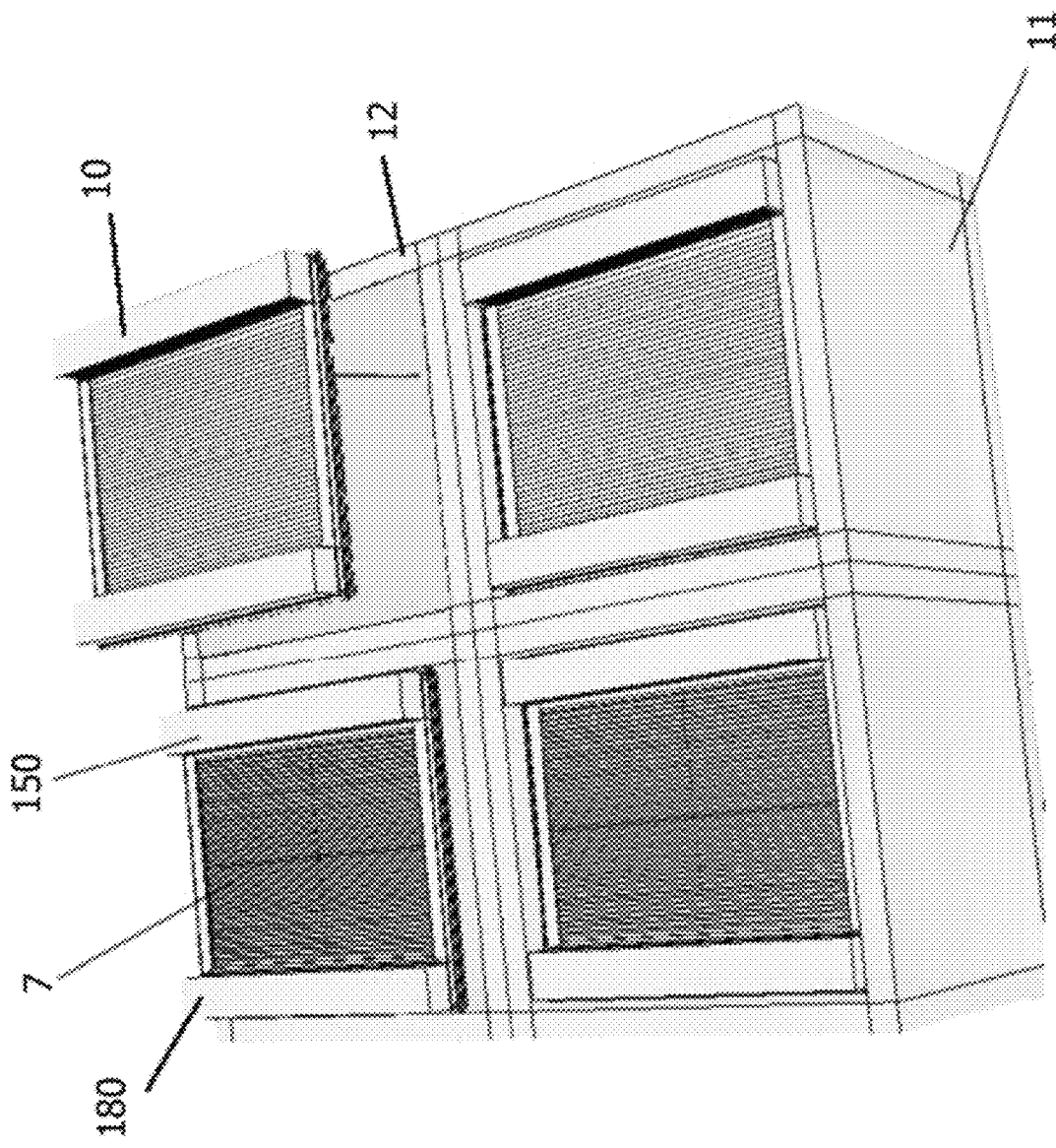
FIG. 11B shows a configuration for a larger scale air filtration application, having four of the embodiment of the instant invention of the type shown in FIGS. 8-10 with magazine input.

FIG. 11B shows a configuration for a larger scale air filtration application, having four of the embodiment of the instant invention of the type shown in FIGS. 8-10 with magazine input. As shown, the system can be used in a plenum or as a pre-filter application for an air handling or scrubbing unit 11 with mountings 12 for several filter frames 10. In the exemplary embodiment shown, four "magazine" style embodiments of the instant invention 1 are shown with vertical box magazines 150,180. In this instance, the magazines are easily approached by service personnel and can be used to aid in installation of the individual filter frames 10. Thus the application of the instant invention can be scaled to address most commercial applications.

FIG. 12 shows a plan view of an exemplary embodiment of the invention. The inclusion of electronics and a controller 60 in any of the exemplary embodiments contained herein, on for example, a printed circuit board on the filter 1 provides an opportunity for added functionality in addition to extended operating length. As noted above with respect to FIG. 1, the controller 60 can also be used to sense a condition of the air, the filter media 70, or a combination of both through communication with the at least one sensor 80. The exemplary version shown in FIG. 12 can utilize any of the filter advance systems previously discussed to provide Flow Quality Management (FQM) features. FQM is a system designed to be incorporated into the filter 1 to monitor the quality of the flow as it passes through the filter 1 and interact with a network system to monitor the flow quality at the point of filtration.

The FQM system is comprised of an at least one flow quality sensor 80, with added processor modules 62 and data transceiving modules 63 on the controller 60. The at least one sensor is incorporated into the filter frame such that it is in the path of flow as it is drawn though the filter frame 10 at the exposure slot 7. The processor module 62 and transceiver module 63 are housed within the filter frame 10 near the drive motor and are powered from the same power supply as the motor. The controller 60, processor modules 62, and transmitting modules 63 have software on them to measure and report flow quality parameters from the at least one sensor 80. They may report the flow quality parameters to an internal storage device (not shown), wirelessly 1010, or via wired communication 1020 directly to a network 1000. Alternatively, in other embodiments an external device which may store the data and/or be enabled to communicate with the network 1000 via wire 1020 or wirelessly 1010 and thereby may report the parameters to the network 1000 as shown in FIG. 9 and described herein below. These can be powered by an onboard, independent power supply or, for example, be powered by a dedicated external power supply in for instance an industrial or commercial application like a paint spray booth.

The at least one sensor 80 allows the system to monitor the air and in conjunction with the processor, collects data regarding air contaminants along with flow quality, for example air quality. These sensors may include but are not limited to sensors that detect and report temperature, mold, carbon monoxide, carbon dioxide, Volatile Organic Compounds, smoke, fire, Noxious Gases, Air Particle Concentration and other potentially dangerous compounds. The at least one sensor 80 can also detect pressure drops and communicate that info back to the filter 1 so that the filter 1 can set the changing cycle accordingly and advance the filter media 70 accordingly. For example, if the filter 1 is pre-set to change the filter media 70 every ninety days and last twelve months but the media is being contaminated at a higher rate as detected by the at least one sensor 80, it will move up the next change to facilitate a consistently clean filter. This change can also be reported out from the filter 1 through the controller 60 and the transmitting modules 63. This real time monitoring can be incorporated in residential unit applications or in industrial and commercial unit applications.

In addition to monitoring flow quality, performance measures can also be communicated as part of the data retrieved from the at least one sensor. A non-limiting example, as noted in the previously described embodiments of FIGS. 1-11, a flow meter can be included in the at least one sensor 80. This would allow, in conjunction with the processing modules 62 on the controller, a measurement of estimated energy usage. This can be reported through the network 1000 by the transceiver module 63 and reported to an alert device, including for example but not limited to a cell phone, a computer, a network operations center or the like. Additionally, as part of the programming on the processing modules 62, the controller 60 can download program guides through the network and notify users and allow for additional configuration options of the filtration system.

All of this information can be stored or sent in real-time or both. The information can be sent, for example but certainly not limited to, to a reporting station, internet access portal, network interface device or internet cloud server via wireless signal, cellular or WI-FI/Internet Wireless Protocol technology or similar signal convention, that is accessible to the user via computer or smart phone or similar device, as shown in FIG. 12. The quality parameters and data on the operation of the filter can also be retrieved directly from the filter via a communications port 67 located on the filter frame, for example but certainly not limited to a USB port or a mini-USB port or similar communications port. Reports can be generated that can be retrieved showing the status of the filter and the flow quality over time. This can also be available for review by a report device accessed by the homeowner and/or building management or to a Network Operations Center (NOC) of the type typically found in industrial or commercial applications or provided as a function of an alarm or alert service in a residential setting or commercial setting.

The network 1000 can then transmit the information to a wireless device or wired device as a network interface 1030, for example, but certainly not limited to a smart phone or hand held computer or netbook or similar device 1060. The network 1000 can also report the data to a computer or other device 1040, wired 1010 or wirelessly 1020 coupled to the network 1000, to report flow quality or other aspects of the filter 1. Finally, the data can be communicated to a Network Operations Center (NOC) or master control center 1050, all of these options happening alone or in conjunction with one another, the NOC which is actively monitoring the filter 1 and the quality in the flow in the filtration system. A non-limiting example of the operation of the Network Operations Center 1050 can be a third party alarm monitoring company which is monitoring flow quality for a customer or several customers. Another non-limiting example can also make the NOC part of a manufacturing facilities control center as part of a commercial or industrial process whereby the filter unit is being monitored by the control center, for instance in chemical production or commercial painting booths.

Notification or alerts, including those previously described in relation to FIGS. 1-8, may be sent to the homeowner or building management or NOC of urgent conditions. These can include emergency alerts that may require immediate attention. This may be a part of the design of a monitoring system enabled via the network or as a paid third party monitoring service. This service may be offered for a monthly fee or reported to a security monitoring company, for example, either via internet, email, cellular, text message or telephone or any other fashion that fits the service providers reporting network. Other responses can involve communication from the filter or from other elements in the network which may, in case of sensing certain parameters i.e. dense smoke, take action with other network components. A non-limiting example of such an action is having the filtration controller turn off the circulation system via communication with the thermostat or similar device to prevent smoke circulation when a smoke or fire or other dangerous substances are detected in the flow.

Thus, in addition to providing a unique filter with the ability to provide and extended useful life with the movement of the filter media, the instant invention includes a method for alerts for replacement and possibly delivery of replacement filters. Additionally, a method of monitoring services is also conceived hereby for use in conjunction with or apart from the method of alerting and replacement.

An inventive method of seamless replacement delivery can be accomplished by employing the filter of FIGS. 1-8 with or without the FQM system. By including just the transceiver modules 63, with or without the additional processor modules 62, an enhanced convenience for filtration unit owners can be incorporated into the sale of the filter. The filter 1, which as noted above can send a signal when the uncontaminated media 72 has been completely dispensed, with the transmission module 63 can send an alert to a user through one of the alert devices 1040, 1050, or 1060 and a replacement filter can be sent. This can of course be conditioned on confirmation from the owner of the filtration unit or can be provided as part of a monthly service. Additionally, the alert can be sent to a center and service personnel dispatched as part of a standard maintenance response or as part of a paid for maintenance service.

In yet another application, as noted above by incorporating the at least one sensor 80 and the processor modules 63, in addition to sending a signal at the completion of the distribution of the uncontaminated filter media 72, real time monitoring can be completed and sent as part of a monthly service contract or as part of a regular maintenance screening or as part of an emergency response. The at least one sensor 80 can transmit data through the controller 60 and the processor modules 62 and transceiver modules 63, the data can be routed to a third party service provider that maintains the filtration unit and monitors flow quality for a subscriber. The data can also be transmitted as part of a regular maintenance monitoring or screening system in an industrial or commercial application to a NOC or similar central control 1050. Also, as noted, the data may also be transmitted as part of an emergency response to a third party or emergency responder or both and additional signals could be transmitted through a network to shut an flow off and prevent promulgation of hazardous contaminants.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A replacement filter within a flow channel comprising:
    a first frame portion of an at least two frame portions, the first frame portion of the at least two frame portions being a cartridge;
    an at least one movement device;
    an at least one motor coupled to and driving the at least one movement device;
    an at least one power source powering the at least one motor;
    a controller;
    an at least one filter media stack having a filter media, the filter media being pleated and folded and compactly stored in the stack and the at least one filter media stack being in the cartridge;
    a second frame portion of an at least two frame portions, the second frame portion of an at least two frame portions being a frame, that couples with the first frame portion of the at least two frame portions forming a housing with an at least one exposure slot through which the flow channel passes, wherein the first and second frame portions of the at least two frame portions are coupled such that the at least one movement member engages the at least one filter media stack in the first of the at least two frame portions, the at least one movement member moves the filter media upon instruction from the controller from a pleated, folded and compact state to extend across the at least one exposure slot to expose the pleated and extended filter media to the flow and through the movement of the at least one movement member to remove exposed filter media and restack and store the exposed filter media in a media cartridge stack.

2. The filter of claim 1, wherein the movement device further comprises at least one of a cord, wire, string, track, puller or pinch rollers, star, toothed, or pin roller, screw drive, threaded rod, or a take-up roller.

3. The filter of claim 1, wherein the movement device comprises an at least one threaded rod and further comprises an at least one sweep bar, wherein the threaded rod engages the sweep bar and moves the filter media and each of the at least one sweep bars, where each of the at least one sweep bars is spaced such that each bar separates a length of filter media that fills the space across the exposure slot.

4. The filter of claim 1, wherein the pleated and folded and compactly stored filter media further comprises an adhesive element wherein the adhesive bond strength of the at least one adhesive element permits removal of the pleats from the folded, pleated filter media stack by a selective removal device such that an at least one portion of the pleats at the point of contact with the adhesive element may remain adhered.

5. The filter of claim 1, wherein the at least one movement device and the at least one motor are contained within the first frame portion of the at least two frame portions.

6. The filter of claim 5, wherein the at least one filter media stack is the first frame portion of an at least two frame portions.

7. The filter of claim 1, wherein the filter media stack is at one end of the housing in a storage area.

8. The filter of claim 1, wherein the exposed filter media is stored in a containment area.

9. The filter of claim 8, wherein the containment area is sealed.

10. The filter of claim 9, wherein the containment area is at a further end of the housing.

11. The filter of claim 1, wherein the filter media is drawn from the filter media stack into a storage area and stored in a compact, pleated, and folded fashion.

12. The filter of claim 11, wherein the containment area is within the filter media stack, such that the filter material is drawn back into the cartridge after exposure.

13. The filter of claim 1, wherein the first and second of the at least two frame portions are of uniform thickness.

14. The filter of claim 1, wherein the first of the at least two frame portions has channel portions.

15. The filter of claim 14, wherein the second of the at least two frame portions has leg portions that sliding engage the channel portions to couple the first frame portion and second frame portion of the at least two frame portions.

16. The filter of claim 1, wherein the filter media stack further comprises an at least one portion of filter media of sufficient length to provide unexposed filter to cross the exposure slot and become exposed filter media.

17. The filter of claim 16, wherein a sensor reports a condition of the exposed portion of the filter media to the controller and the controller upon receipt of the condition determines if movement of the movement member moves an amount of unexposed media into the exposure slot to cover the exposure slot.

18. The filter of claim 17, further comprising several spacers or sweep bars which divide several lengths of unexposed media which are stored and moved into the exposure slot based on commands from the controller.

19. The filter of claim 1, wherein the frame is constructed of stiffened cardboard or plastic or metal.

20. The filter of claim 1, wherein the frame contains the at least one motor with the at least one power source and the controller.

21. The filter of claim 1, wherein the at least one cartridge contains the at least one movement member.

22. The filter of claim 21, wherein the at least one motor is coupled to the at least one movement member through a coupling that penetrates through the exterior of the filter cartridge.

23. The filter of claim 1, further comprising an at least one securement coupling wherein with the insertion of the filter cartridge into the frame the at least one securement coupling secures the filter cartridge and engages the coupling.

24. The filter of claim 1, wherein the first frame portion of the at least two frame portions further comprises a supply cartridge and a third frame portion of an at least two frame portions further comprises a collection cartridge and the third frame portion of an at least two frame portions couples to the first and third portions to form the housing with the first and third portions of the at least two portions extending from the housing.

25. The filter of claim 24, further comprising an at least one securement coupling the supply cartridge and the collection cartridge to the housing.

26. The filter of claim 25, wherein the at least one securement coupling is an at least one of an at least one releasable straps, snaps, buckles, interlocking parts slidingly engaged, clasps, and friction fit elements.

27. The filter of claim 26, wherein the filter media stack extends in the supply cartridge in the same plane as the housing with a movement bar dividing the pleated, folded and stacked filter media stack.

28. The filter of claim 27, wherein the media stack is advanced and a further media stack having a sweep bar is pulled down from the supply cartridge.

29. The filter of claim 28, further comprising an at least one guide member to assist in advancing the exposed folded, pleated media into the collection cartridge.

30. The filter of claim 29, wherein the media stack is withdrawn into the collection cartridge and the sweep bar is driven along a single threaded shaft as a movement member in the middle of the housing and then upward onto a further guide member into the collection cartridge.

31. The filter of claim 24, wherein the collection cartridge is U-shaped, straight horizontal, vertically stacked, or s-shaped.

32. The filter of claim 24, wherein the collection cartridge is an angled collection cartridge.

33. The filter of clam 24, further comprising an at least one guide rail in the collection cartridge.

34. The filter of claim 33, wherein the guide rail is a turning screw mechanism and assists in driving an at least one sweep bar.

35. The filter of claim 24, wherein the movement member is an auger screw on a collection cartridge side of the exposure slot and a star wheel indexer on supply cartridge side of the exposure slot.

36. The filter of claim 1, wherein the controller further comprises an at least one processing module and an at least one transceiver module on the controller and an at least one sensor, the controller communicating with the at least one sensor, the at least one sensor communicating data to the processing module and the controller, and the transceiver module transmitting data from the filter to a network or a storage device.

37. The filter of claim 36, wherein the at least one sensor is coupled to the controller and sensing an at least one operating parameter for the filter.

38. The filter of claim 37, wherein the at least one sensor measures temperature, mold count, carbon monoxide, carbon dioxide, Volatile Organic Compounds (VOCs), smoke, fire, noxious gases, and air particle concentrations or the at least one sensor measures air flow and reports estimated energy consumption to the network or storage device.

39. The filter of claim 37, wherein the controller communicates through the transceiver module with a further network interface device.

40. The filter of claim 39, wherein the network interface device is a Wi-Fi enabled device or an internet gateway to a network which in turn reports it to an alert device or a Network Operations Center or control center.

41. The filter of claim 1, wherein the at least one movement member is an at least one screw drive or threaded rod.

42. The filter of claim 1, further comprising an at least one motor coupling, the at least one motor coupling engaging the at least one motor to the at least one movement member wherein the second frame portion contains the at least one motor, the controller, and the at least one power source and the first frame member contains the filter media stack and the at least one movement member and the at least one motor coupling such that when the cartridge and frame are coupled to form the housing, the at least one motor coupling is engaged with the at least one motor.

43. The filter of claim 1, further comprising an at least one motor coupling, the at least one motor coupling engaging the at least one motor to the at least one movement member wherein the second frame portion contains the at least one motor and the controller and the first frame member contains the filter media stack and the at least one movement member, the at least one power source, and the at least one motor coupling such that when the cartridge and frame are coupled to form the housing, the at least one motor coupling is engaged with the at least one motor.

44. A replacement filter deployed within a flow channel comprising:

a housing having a first frame member of an at least two frame members and a second frame member of an at least two frame members that are detachable with an at least one exposure slot formed within the housing by the at least two frame members;

an at least one filter media storage area within the housing, having unexposed, folded, pleated filter media stored therein, the unexposed folded, pleated filter media being pleated, folded, and stacked to be compactly held within the at least one filter media storage area;

an at least one motor coupled to a power supply and in communication with a controller, the at least one motor moving an at least one movement member that advances an unexposed portion of the compactly held pleated, folded, and stacked pleated filter media into the at least one exposure slot, expanding and exposing the unexposed portion of the pleated filter media to the flow channel while retaining the pleats and creating an exposed portion of the at least one pleated filter media with an at least one processing module and an at least one transceiver module and the controller communicating with the at least one sensor, the at least one sensor communicating data to the processing module and the controller, and the transceiver module transmitting data from the filter to a network or a storage device; and a containment area, wherein the exposed portion of the pleated filter media is collected folded, restacked and compactly stored and retained within the containment area.

45. The filter of claim 41, wherein the first frame member is a filter media cartridge and, the filter media cartridge containing a folded pleated filter media stacked and stored so as to be in a compact state, which is engaged by the at least one movement member and withdrawn from the filter media stack in the filter media cartridge and, after being engaged by the at least one movement member, selectively removed back into the filter media cartridge in the the compact state as exposed filter media in the containment area for removal.

46. The filter of claim 41, wherein the stacked filter media is held with an at least one adhesive element having a separation force such that the separation force allows for separation of the folded, pleated filter media such that an element of the pleat remains adhered so as to prevent air flow around an edge of the unexposed portion of the filter media when it is in the exposure slot.

47. The filter of claim 41, wherein the at least one movement member comprises a star wheel moving the material from a portion containing the unexposed filter media with pleats contained thereon and an at least one auger screw drive assisting in collecting the exposed, pleated filter media and further comprising an at least one support assisting in supporting the filter media on the pleats and assisting in producing a pleated pattern.

48. The filter of claim 41, wherein the first frame member is a housing frame and the second frame member is a filter.

49. The filter of claim 46, further comprising an at least one motor coupling, the at least one motor coupling engaging the at least one motor to the at least one movement member wherein the first frame member contains the at least one motor, the at least one controller, and the at least one power source and the second frame member contains the filter media stack and the at least one movement member.

50. The filter of claim 46, further comprising an at least one motor coupling, the at least one motor coupling engaging the at least one motor to the at least one movement member wherein the first frame member contains the at least one motor and the at least one controller and the second frame member contains the filter media stack, the at least one movement member, and the at least one power source.

51. The filter of claim 41, wherein the at least one movement member is at least one of at least one of a cord, wire, string; track, puller or pinch rollers, star, toothed, or pin roller, screw drive, threaded rod, or a take-up roller.

52. The filter of claim 41, wherein the at least one movement member is at least one screw drive or threaded rod.

\* \* \* \* \*